United States Patent
Ge et al.

(10) Patent No.: US 10,755,718 B2
(45) Date of Patent: Aug. 25, 2020

(54) SYSTEM AND METHOD FOR NEURAL NETWORK BASED SPEAKER CLASSIFICATION

(71) Applicant: INTERACTIVE INTELLIGENCE GROUP, INC., Indianapolis, IN (US)

(72) Inventors: Zhenhao Ge, Zionsville (IN); Ananth N. Iyer, Carmel (IN); Srinath Cheluvaraja, Carmel (IN); Ram Sundaram, Hyderabad (IN); Aravind Ganapathiraju, Hyderabad (IN)

(*) Notice: Subject to any disclaimer, the term of this patent is extended or adjusted under 35 U.S.C. 154(b) by 116 days.

(21) Appl. No.: 15/835,318

(22) Filed: Dec. 7, 2017

(65) Prior Publication Data
US 2018/0158463 A1 Jun. 7, 2018

Related U.S. Application Data

(60) Provisional application No. 62/431,120, filed on Dec. 7, 2016.

(51) Int. Cl.
| | |
|---|---|
| *G10L 17/00* | (2013.01) |
| *G10L 17/04* | (2013.01) |
| *G10L 25/45* | (2013.01) |
| *G10L 17/18* | (2013.01) |
| *G10L 25/93* | (2013.01) |

(52) U.S. Cl.
CPC .............. *G10L 17/04* (2013.01); *G10L 17/00* (2013.01); *G10L 17/18* (2013.01); *G10L 25/45* (2013.01); *G10L 2025/937* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 6,370,500 B1* | 4/2002 | Huang ................. | G10L 19/012 704/207 |
| 6,519,561 B1* | 2/2003 | Farrell .................... | G10L 15/07 704/232 |
| 6,922,668 B1* | 7/2005 | Downey ................. | G10L 17/02 704/246 |

(Continued)

FOREIGN PATENT DOCUMENTS

WO         2014109847 A1       7/2014

OTHER PUBLICATIONS

International Search Report and Written Opinion for Application No. PCT/US2017/065196, dated Mar. 29, 2018, 12 pages.

(Continued)

*Primary Examiner* — Jesse S Pullias

(57) ABSTRACT

A method for classifying speakers includes: receiving, by a speaker recognition system including a processor and memory, input audio including speech from a speaker; extracting, by the speaker recognition system, a plurality of speech frames containing voiced speech from the input audio; computing, by the speaker recognition system, a plurality of features for each of the speech frames of the input audio; computing, by the speaker recognition system, a plurality of recognition scores for the plurality of features; computing, by the speaker recognition system, a speaker classification result in accordance with the recognition scores; and outputting, by the speaker recognition system, the speaker classification result.

22 Claims, 19 Drawing Sheets

(56) References Cited

U.S. PATENT DOCUMENTS

| | | | |
|---|---|---|---|
| 2003/0009333 A1* | 1/2003 | Sharma | G10L 15/04 704/246 |
| 2004/0236573 A1* | 11/2004 | Sapeluk | G10L 17/02 704/224 |
| 2004/0260550 A1* | 12/2004 | Burges | G10L 17/00 704/259 |
| 2009/0216528 A1* | 8/2009 | Gemello | G10L 15/065 704/232 |
| 2010/0332222 A1 | 12/2010 | Bai et al. | |
| 2014/0270226 A1* | 9/2014 | Borgstrom | G10L 17/00 381/71.11 |
| 2015/0161995 A1 | 6/2015 | Sainath et al. | |
| 2015/0332667 A1 | 11/2015 | Mason | |
| 2016/0203833 A1* | 7/2016 | Zhu | G10L 25/78 704/233 |
| 2016/0283185 A1 | 9/2016 | McLaren et al. | |

OTHER PUBLICATIONS

Ge, Zhenhao, et al., Neural Network Based Speaker Classification and Verification Systems with Enhanced Features, Intelligent Systems Conference 2017, Sep. 7-8, 2017, London, UK, 6 pages.

* cited by examiner

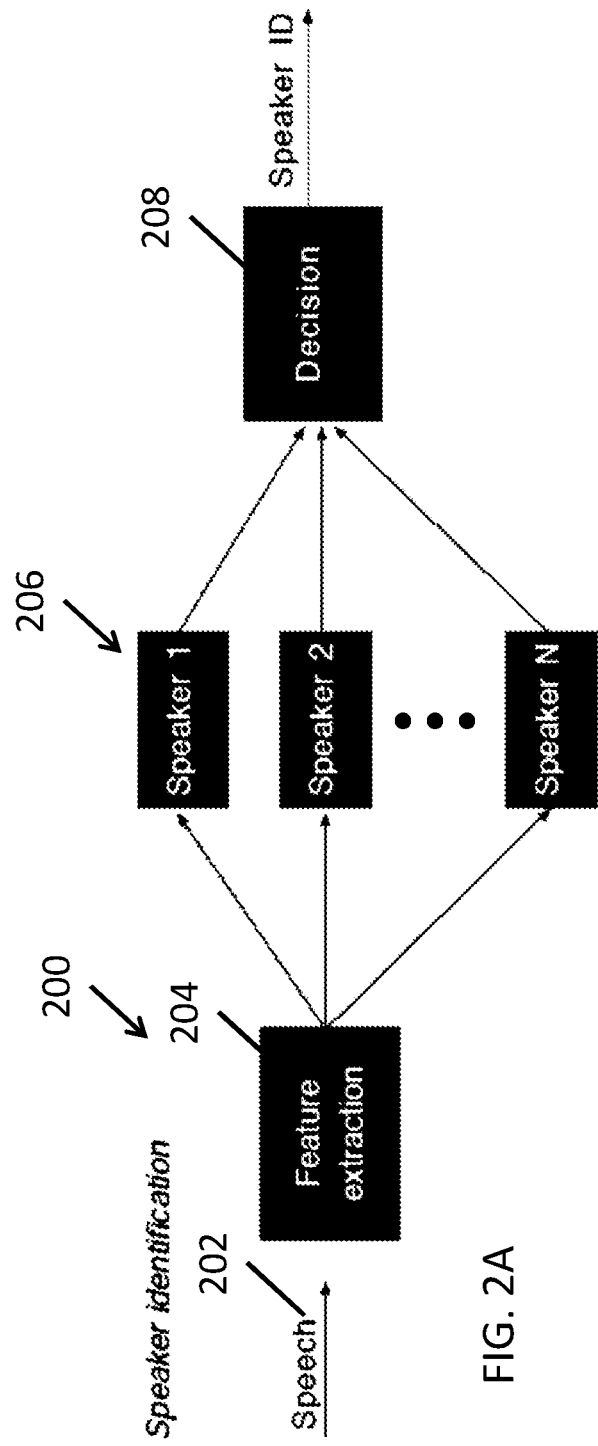
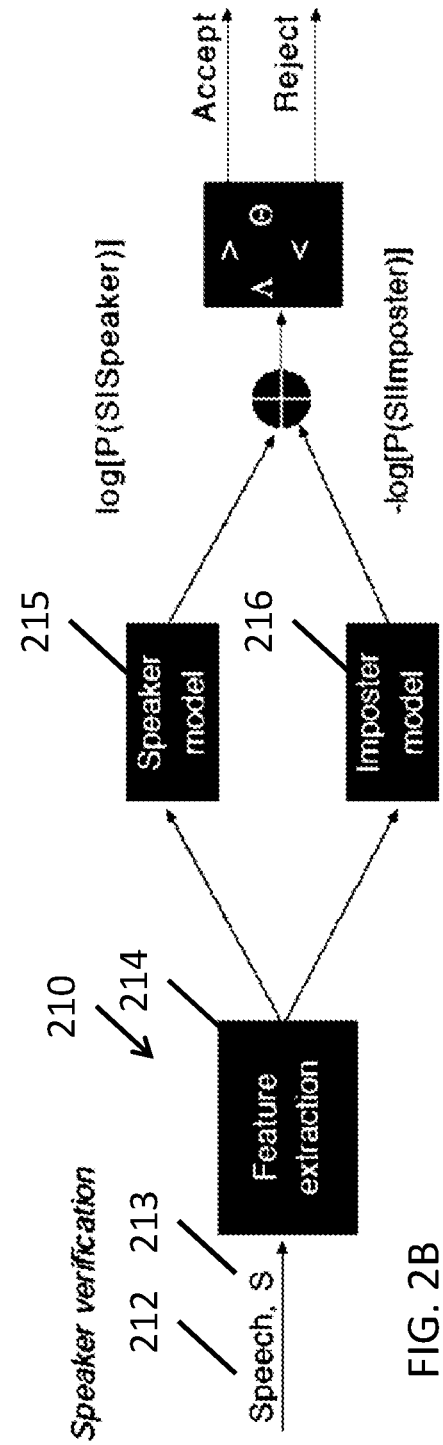
FIG. 2A
FIG. 2B

SYSTEM AND METHOD FOR NEURAL NETWORK BASED SPEAKER CLASSIFICATION

CROSS-REFERENCE TO RELATED APPLICATION(S)

This application claims the benefit of U.S. Provisional Patent Application No. 62/431,120, filed in the United States Patent and Trademark Office on Dec. 7, 2016, the entire disclosure of which is incorporated by reference herein.

FIELD

Aspects of embodiments of the present invention relate to systems and methods for recognizing speakers from audio of the speech from the speakers.

BACKGROUND

Automated systems for detecting and recognizing speech, e.g., words spoken in the form of audible signals or sounds and automatically recognizing speakers from the speech can be applied in a wide variety of contexts. For example, an interactive media response system (IMR) of a contact center may use automatic speaker recognition to confirm the identity of the customer that the IMR system is interacting with before providing private information to the customer (e.g., "My voice is my passport. Verify me."). Automatic speaker recognition may also be used to distinguish between different people who share the same phone number.

Speaker recognition generally includes three aspects: speaker detection, which relates to detecting if there is a speaker in the audio; speaker identification, which relates to identifying whose voice it is; and speaker verification or authentication, which relates to verifying someone's voice. In circumstances where the set of possible speakers is closed, (e.g., the audio must be from one of a set of enrolled speakers), then speaker identification can be simplified to speaker classification. Some of the building blocks of speaker recognition systems include speaker segmentation, clustering and diarization.

SUMMARY

Aspects of embodiments of the present invention relate to systems and methods for speaker classification. Some aspects of embodiments of the present invention relate to systems and methods for extracting features from input audio containing speech from a speaker. Additional aspects of embodiments of the present invention relate to systems and methods for recognizing and verifying speakers based on the extracted features.

According to one embodiment of the present invention, a method for classifying speakers includes: receiving, by a speaker recognition system including a processor and memory, input audio including speech from a speaker; extracting, by the speaker recognition system, a plurality of speech frames containing voiced speech from the input audio; computing, by the speaker recognition system, a plurality of features for each of the speech frames of the input audio; computing, by the speaker recognition system, a plurality of recognition scores for the plurality of features; computing, by the speaker recognition system, a speaker classification result in accordance with the recognition scores; and outputting, by the speaker recognition system, the speaker classification result.

The extracting the speech frames may include: dividing the input audio into the plurality of speech frames; computing a short term energy of each speech frame; computing a spectral centroid of each speech frame; classifying a speech frame as a voiced frame in response to determining that the short term energy of the speech frame exceeds a short term energy threshold and that the spectral centroid of the speech frame exceeds a spectral centroid threshold, and classifying the speech frame as an unvoiced frame otherwise; retaining the voiced frames and removing the unvoiced frames; and outputting the retained voiced frames as the speech frames containing voiced speech.

The computing the plurality of features for each of the speech frames may include: dividing the speech frames into overlapping windows of audio; normalizing each of the windows of audio; computing mel-frequency cepstral coefficients, deltas, and double deltas for each window; and computing the plurality of features from the mel-frequency cepstral coefficients, deltas, and double deltas for each window.

The normalizing each of the windows of audio may include applying speaker-level mean-variance normalization.

The computing the plurality of features from the mel-frequency cepstral coefficients, deltas, and double deltas for each window may include: grouping the windows into a plurality of overlapping frames, each of the overlapping frames including a plurality of adjacent windows; for each overlapping frame of the overlapping frames, concatenating the mel-frequency cepstral coefficients, the deltas, and the double deltas of the adjacent windows to generate a plurality of features of the overlapping frame; and outputting the features of the overlapping frames as the plurality of features.

The computing the speaker classification result may include forward propagating the plurality of features through a trained multi-class neural network, the trained multi-class neural network being trained to compute the recognition scores, each of the recognition scores corresponding to a confidence that the speech of the input audio corresponds to speech from one of a plurality of enrolled speakers.

The trained multi-class neural network may be trained by: receiving training data including audio including speech from a plurality of enrolled speakers, the audio being labeled with the speakers; extracting a plurality of features from the audio for each of the enrolled speakers; applying speaker-level mean-variance normalization to the features extracted from the audio for each of the enrolled speakers; and training the multi-class neural network to classify an input feature vector as one of the plurality of enrolled speakers.

The training the multi-class network may include iteratively reducing a regularization parameter of a cost function.

The speaker classification result may include an identification of a particular speaker of a plurality of enrolled speakers, and the identification of the particular speaker may be computed by identifying a highest recognition score of the plurality of recognition scores and by identifying the particular speaker associated with the highest recognition score.

The method may further include receiving an allegation that the speaker is a particular enrolled speaker of a plurality of enrolled speakers, wherein the speaker classification result is a speaker verification indicating whether the speaker of the speech of the input audio corresponds to the particular enrolled speaker of the plurality of enrolled speakers. The method may further include computing the speaker verification by: comparing the recognition score corresponding to the particular speaker to a threshold value; and outputting a speaker verification indicating that the speaker of the speech of the input audio corresponds to the particular enrolled speaker of the plurality of enrolled speakers in response to determining that the recognition score exceeds the threshold value and determining that the recognition score is higher than all other enrolled speakers. The threshold may include a speaker-specific threshold, and wherein the speaker-specific threshold may be computed by solving for an intersection between a first Gaussian distribution representing the probability that the speaker of the input audio is one of the enrolled speakers and a second Gaussian distribution representing the probability that the speaker of the input audio is not one of the enrolled speakers.

According to one embodiment of the present invention, a system for classifying speakers includes: a processor; and memory storing instructions that, when executed by the processor, cause the processor to: receive input audio including speech from a speaker; extract a plurality of speech frames containing voiced speech from the input audio; compute a plurality of features for each of the speech frames of the input audio; compute a plurality of recognition scores for the plurality of features; compute a speaker classification result in accordance with the recognition scores; and output the speaker classification result.

The memory may further store instructions that, when executed by the processor, cause the processor to extract the speech frames by: dividing the input audio into the plurality of speech frames; computing a short term energy of each speech frame; computing a spectral centroid of each speech frame; classifying a speech frame as a voiced frame in response to determining that the short term energy of the speech frame exceeds a short term energy threshold and that the spectral centroid of the speech frame exceeds a spectral centroid threshold, and classifying the speech frame as an unvoiced frame otherwise; retaining the voiced frames and removing the unvoiced frames; and outputting the retained voiced frames as the speech frames containing voiced speech.

The memory may further store instructions that, when executed by the processor, cause the processor to compute the plurality of features for each of the speech frames by: dividing the speech frames into overlapping windows of audio; normalizing each of the windows of audio; computing mel-frequency cepstral coefficients, deltas, and double deltas for each window; and computing the plurality of features from the mel-frequency cepstral coefficients, deltas, and double deltas for each window.

The normalizing each of the windows of audio may include applying speaker-level mean-variance normalization.

The computing the plurality of features from the mel-frequency cepstral coefficients, deltas, and double deltas for each window may include: grouping the windows into a plurality of overlapping frames, each of the overlapping frames including a plurality of adjacent windows; for each overlapping frame of the overlapping frames, concatenating the mel-frequency cepstral coefficients, the deltas, and the double deltas of the adjacent windows to generate a plurality of features of the overlapping frame; and outputting the features of the overlapping frames as the plurality of features.

The memory may further store instructions that, when executed by the processor, cause the processor to compute the speaker classification result by forward propagating the plurality of features through a trained multi-class neural network, the trained multi-class neural network being trained to compute the recognition scores, each of the recognition scores corresponding to a confidence that the speech of the input audio corresponds to speech from one of a plurality of enrolled speakers.

The trained multi-class neural network may be trained by: receiving training data including audio including speech from a plurality of enrolled speakers, the audio being labeled with the speakers; extracting a plurality of features from the audio for each of the enrolled speakers; applying speaker-level mean-variance normalization to the features extracted from the audio for each of the enrolled speakers; and training the multi-class neural network to classify an input feature vector as one of the plurality of enrolled speakers. The training the multi-class network may include iteratively reducing a regularization parameter of a cost function.

The speaker classification result may include an identification of a particular speaker of a plurality of enrolled speakers, and the memory may further store instructions that, when executed by the processor, cause the processor to compute the identification of the particular speaker by identifying a highest recognition score of the plurality of recognition scores and by identifying the particular speaker associated with the highest recognition score.

The memory may store instructions that, when executed by the processor, cause the processor to receive an allegation that the speaker is a particular enrolled speaker of a plurality of enrolled speakers, and the speaker classification result may be a speaker verification indicating whether the speaker of the speech of the input audio corresponds to the particular enrolled speaker of the plurality of enrolled speakers.

The memory may further store instructions that, when executed by the processor, cause the processor to compute the speaker verification by: comparing the recognition score corresponding to the particular speaker to a threshold value; and outputting a speaker verification indicating that the speaker of the speech of the input audio corresponds to the particular enrolled speaker of the plurality of enrolled speakers in response to determining that the recognition score exceeds the threshold value and determining that the recognition score is higher than all other enrolled speakers.

The threshold may include a speaker-specific threshold, and wherein the speaker-specific threshold may be computed by solving for an intersection between a first Gaussian distribution representing the probability that the speaker of the input audio is one of the enrolled speakers and a second Gaussian distribution representing the probability that the speaker of the input audio is not one of the enrolled speakers.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a block diagram illustrating various portions of a speaker identification system and FIG. 2B is a block diagram illustrating various portions of a speaker verification system.

DETAILED DESCRIPTION

Aspects of embodiment of the present invention are directed to a framework based on a feed-forward neural network for text-independent speaker classification and verification, which are two related systems of speaker recognition. In various experiments, embodiments of the present invention have achieved a 100% classification rate in classification with an Equal Error Rate (ERR) of less than 6%, using merely about 1 second and 5 seconds of audio data, respectively. Some aspects of embodiments of the present invention relate to using features with stricter Voice Active Detection (VAD) than used in comparative systems for speech recognition, thereby resulting in extracting a stronger voiced portion for speaker recognition. Furthermore, aspects of embodiment of the present invention are directed to speaker-level mean and variance normalization, which helps to reduce or eliminate the discrepancy between samples from the same speaker, thereby improving performance (e.g., accuracy) over comparative systems.

Some aspects of embodiments of the present invention relate to the training or building of a neural network speaker classifier according to embodiments of the present invention, where the network structure parameters are computed using grid search, and dynamically reduced regularization parameters are used to avoid premature termination of the training process in a local minimum. Some aspects of embodiments of the present invention improve performance in speaker verification by applying prediction score normalization, which rewards the speaker identity indices with distinct peaks and penalizes the weak ones with high scores but more competitors, and by applying speaker-specific thresholding, which significantly reduces ERR in the receiver operating characteristic (ROC) curve.

Contact Center Overview

Figure 1:
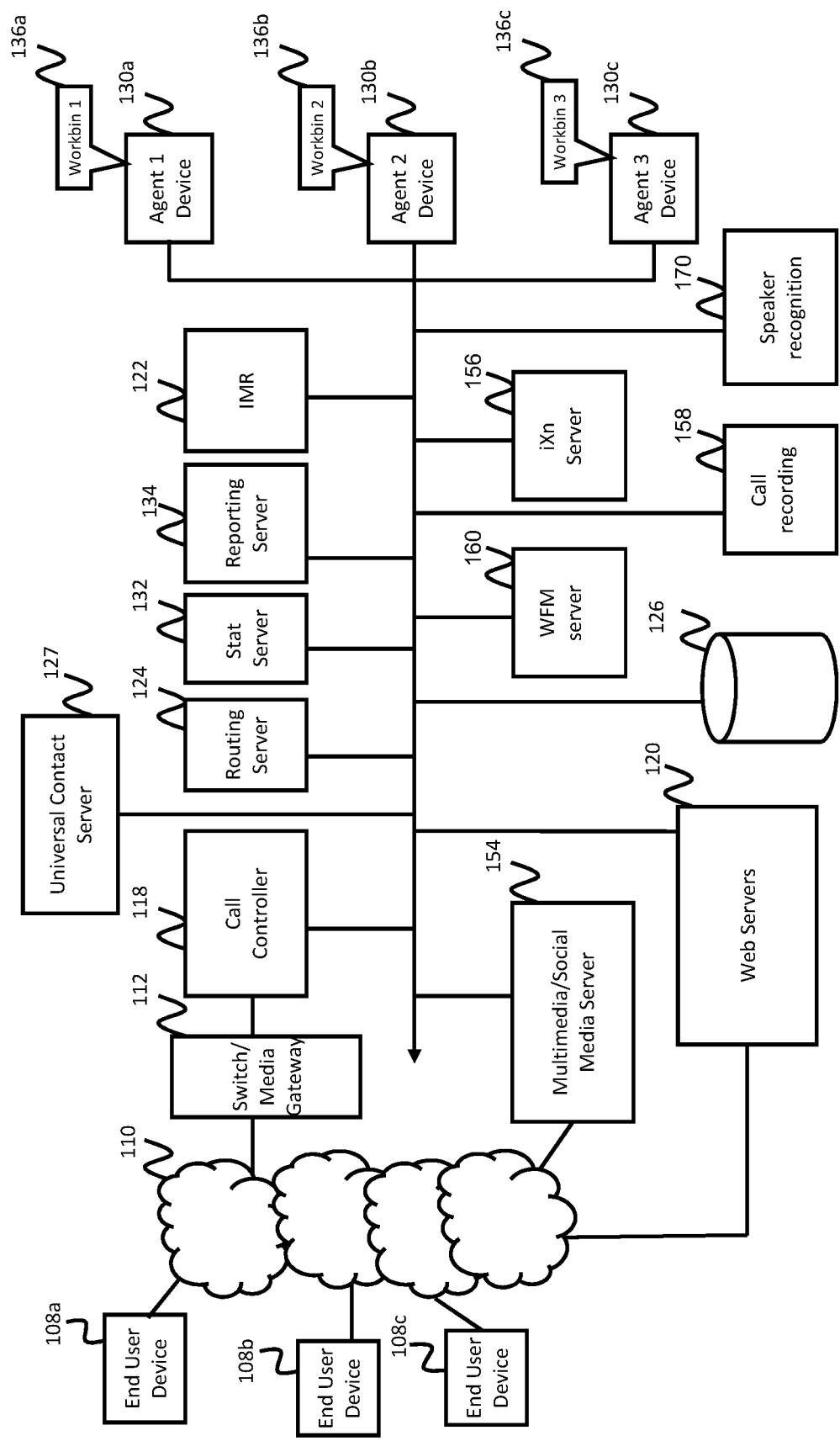
FIG. 1 is a schematic block diagram of a system for supporting a contact center in providing contact center services according to one exemplary embodiment of the invention.

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include a call recording server 158 configured to record interactions, including voice calls, text chats, emails, and the like. The recorded interactions may be stored in the mass storage device 126, in addition to other types of data. In some embodiments, the mass storage device includes multiple storage devices (e.g., multiple hard drives or solid state drives). In some embodiments of the present invention, the mass storage device 126 is abstracted as a data storage service, which may be a cloud based service such as Amazon Simple Storage Service (S3) or Google Cloud Storage.

The contact center system may also include a workforce management server 160, which is configured to manage the agents of a contact center, including setting the work schedules of the agents of the contact center in accordance with predicted demand (e.g., predicted numbers of incoming and outgoing interactions with the contact center across the different media types), in accordance with agent vacation plans, break times, and the like. The schedules generated by the workforce management server may also account for time spent by agents and supervisors in meetings, group or individual training sessions, coaching sessions, and the like. Taking into account the various demands on an agent's time and a supervisor's time during the work day can be used to ensure that there are sufficient agents available to handle the interactions workload.

The contact center system may further include a speaker recognition server 170 or speaker recognition module 170 configured to provide speaker recognition services to the contact center. For example, the speaker recognition server 170 may be configured to receive audio data as input and to automatically generate recognition information about the audio, such as whether there is a person speaking in the audio, the identity of the person speaking in the audio, and verification that the speaker in the audio corresponds to a particular person.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Speaker Recognition Systems

As noted above, speaker recognition generally includes three aspects: speaker detection, which relates to detecting if there is a speaker in the audio; speaker identification, which relates to identifying whose voice it is; and speaker verification or authentication, which relates to verifying someone's voice.

FIG. 2A is a block diagram illustrating various portions of a speaker identification system and FIG. 2B is a block diagram illustrating various portions of a speaker verification system. the main approaches in this area includes 1) template matching such as nearest neighbor and vector quantization, 2) neural network, such as time delay neural network decision tree, and 3) probabilistic models, such as Gaussian Mixture Model (GMM) with Universal Background Model (UBM), joint factor analysis, i-vector, Support Vector Machine (SVM), and the like. These methods can also be divided into text-dependent and text-independent, where the former achieves better performance with additional information, and the latter is generally easier to use.

As shown in FIG. 2A, a speaker identification system 200 may take speech input 202 (e.g., an audio file or audio stream, such as a pulse coded modulation data signal) and extract features from the speech input 202 using a feature extraction module 204 (to be described in more detail below). The extracted features may then be matched against a plurality of different speaker models 206 (labeled Speaker 1, Speaker 2, . . . , Speaker N in FIG. 2A) to generate a plurality of recognition scores representing the quality of the match between the features extracted from the speech 202 and the speaker models 206. A decision module 208 selects which of the speaker models 206 is a best fit with the speech 202 and outputs a Speaker ID corresponding to the best scoring match (e.g., having the highest recognition score).

As shown in FIG. 2B, a speaker verification system 210 is directed to a different problem, namely determining whether the input speech data 212 was spoken by speaker S 213. The input speech data 212 is supplied to a feature extraction module 214 to generate a plurality of features (described in more detail below) and the features are supplied to both a speaker model 215 corresponding to the speaker S 213 and an imposter module 216. The outputs of the comparisons between the extracted features and the speaker model 215 and the imposter module 216 (respectively labeled log(P(S|Speaker)) and −log(P(S|Imposter)) in FIG. 2B) are summed Λ and compared against a threshold value θ. If the sum Λ is greater than the threshold value Θ, then the identity of the speaker is verified ("Accept") and if the sum is less than the threshold value Θ, then the speaker is not verified ("Reject").

Neural Network Architecture for Speaker Classification

Figure 3:
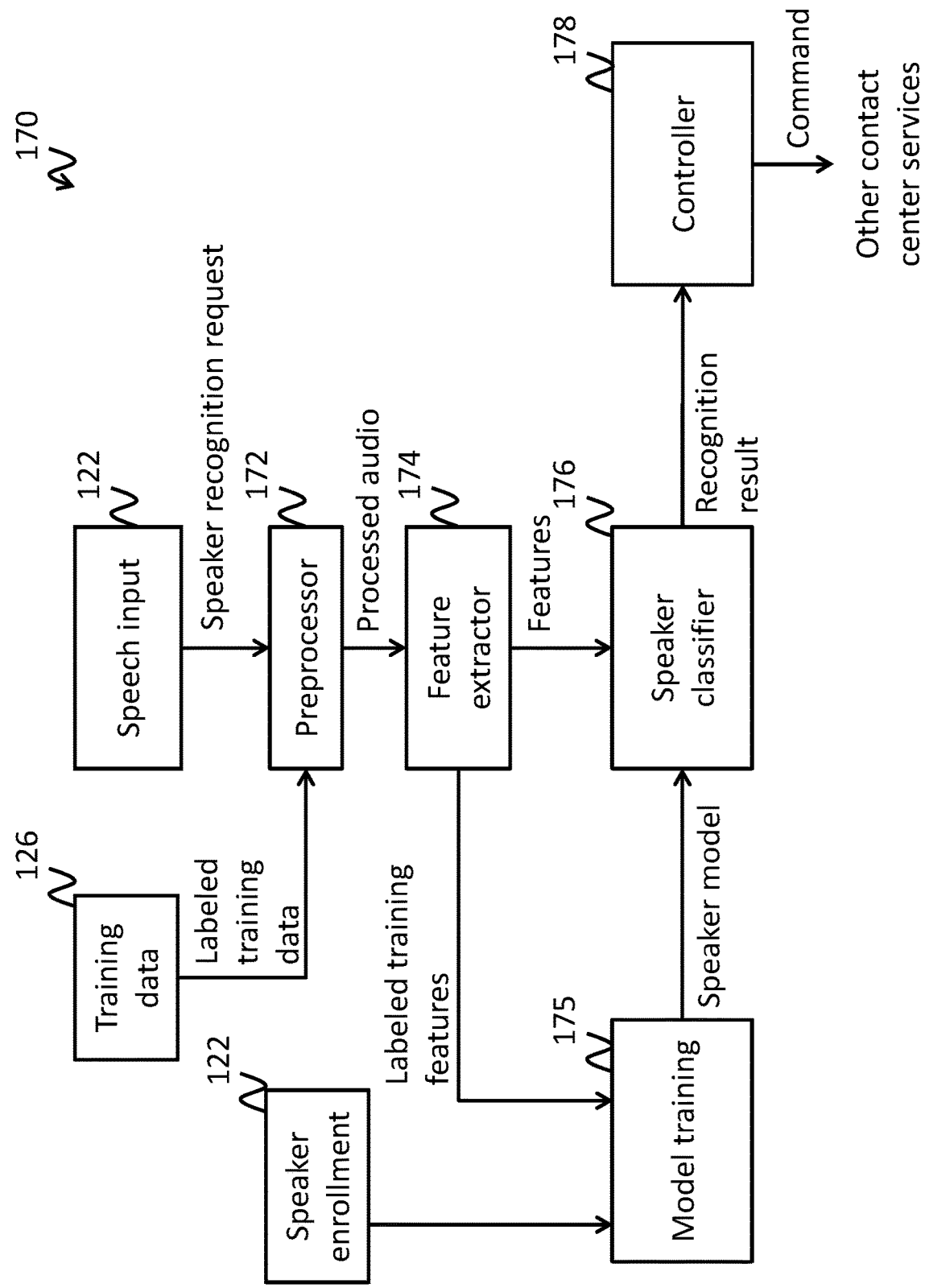
FIG. 3 is a block diagram illustrating a speaker classification system according to one embodiment of the present invention.
Figure 4:
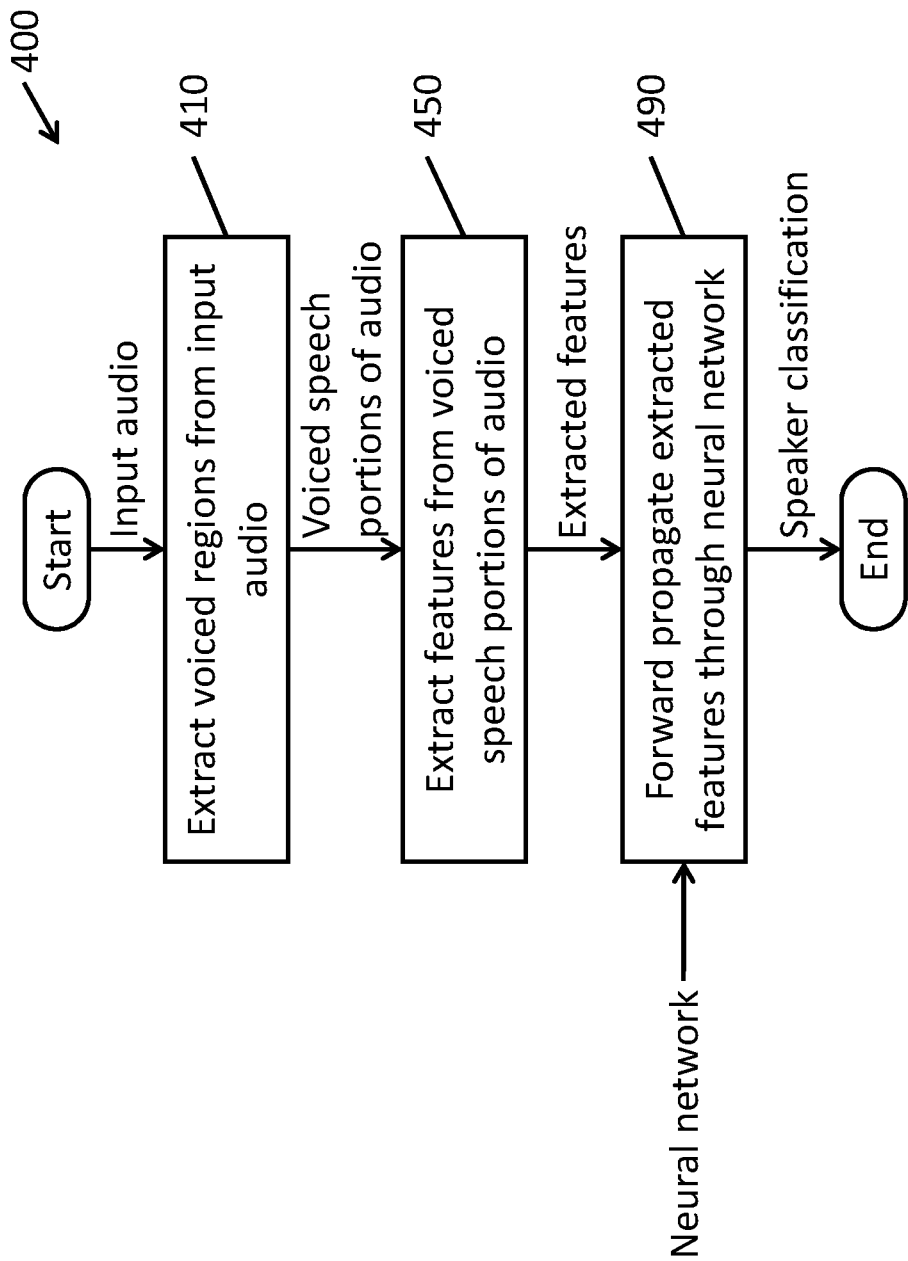
FIG. 4 is a flowchart of a method for classifying a speaker according to one embodiment of the present invention.

FIG. 3 is a block diagram illustrating a speaker classification system according to one embodiment of the present invention. FIG. 4 is a flowchart of a method for classifying a speaker according to one embodiment of the present invention.

Referring to FIGS. 3 and 4, a speech recognition request may be received from another part of the contact center, such as the interactive media response (IMR) server 122. For example, the IMR 122 may provide audio containing speech from the customer, and the request may include a request for recognition of the particular speaker (e.g., identifying one the enrolled speakers that the sample sounds most similar to). In operation 410, the preprocessor 172 extracts the voiced portions of the audio received from the IMR 122 (e.g., the portions containing speech rather than merely silence or line noise). In operation 450, a feature extractor 174 extracts features from the processed audio and supplies the extracted features to a speaker recognition module or speaker classifier 176, which, in operation 490, generates a recognition result (e.g., a classification of the speaker). The recognition result may then be supplied to a controller 178, which can send a command to another part of the contact center, such as sending a response to the IMR 122 containing the identity of the recognized speaker, sending a message to an authentication server to allow the customer to complete their login to a system, and the like.

Preprocessing

According to one embodiment of the present invention, preprocessing includes a) scaling the maximum of the absolute amplitude to 1 (e.g., normalizing the input audio), and b) Voice Activity Detection (VAD) to reduce or eliminate the unvoiced part of speech. Experiments show both speaker classification and verification can perform significantly better if speakers are evaluated only using voiced speech, especially when the data is noisy.

According to one embodiment, a method described by Theodoros Giannakopoulos (Theodoros Giannakopoulos, "A method for silence removal and segmentation of speech signals, implemented in Matlab," University of Athens, Athens, 2009.) with short-term energy and spectral centroid is modified to perform voice activity detection.

Figure 5A:
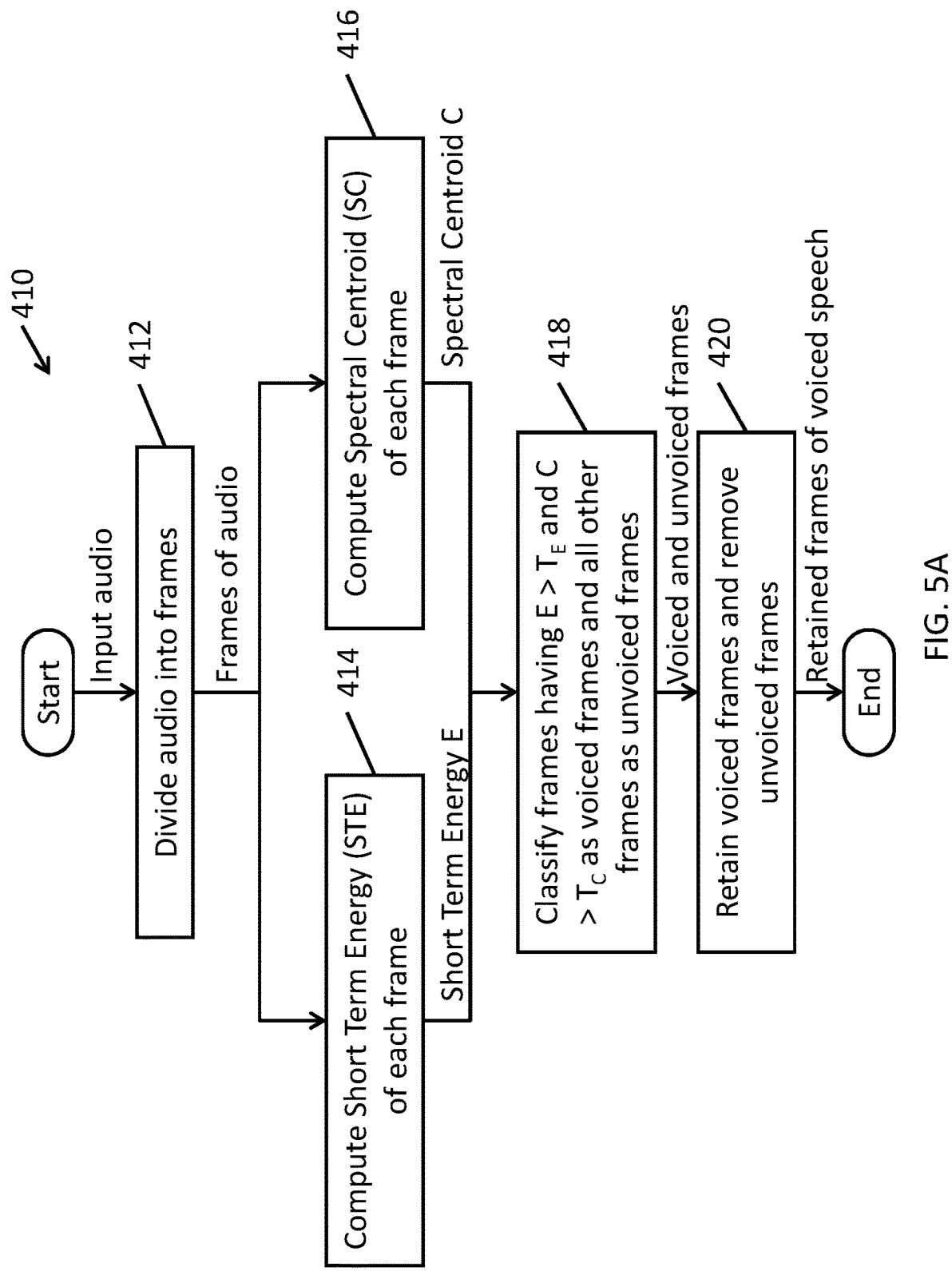
FIG. 5A is a flowchart of a method for voice activity detection according to one embodiment of the present invention.

FIG. 5A is a flowchart of a method for voice activity detection according to one embodiment of the present invention. In operation 412 (e.g., after the input audio has been normalized), the preprocessor 172 divides the input audio into a plurality of speech frames.

Given a short term signal s(n) with N samples, the Short-Term Energy (STE) E is:

$$E = \frac{1}{N} \sum_{n=1}^{N} |s(n)|^2,$$

and given the corresponding Discrete Fourier Transform (DFT) S(k) of s(n) with K frequency components, the Spectral Centroid (SC) C can be formulated as:

$$C = \frac{\sum_{k=1}^{K} kS(k)}{\sum_{k=1}^{K} S(k)}$$

The Short-Term Energy (STE) E is used to discriminate silence with environmental noise, and the Spectral Centroid (SC) C can be used to remove non-environmental noise (non-speech sound, such as coughing, mouse clicking and keyboard tapping) because they usually have different SCs compared to human speech. The preprocessor 172 calculates the STE E for each speech frame in operation 414, and calculates the SC C for each frame in operation 416. When computing the frame-level E and C, in one embodiment, a 50 ms window size and a 25 ms hop size are used.

In operation 418, the preprocessor 172 only considers the speech frame to be voiced when E and C are both above their thresholds $T_E$ and $T_C$ and classifies the speech frames as voiced frames or unvoiced frames, accordingly. In one embodiment, in operation 420, unvoiced speech frames are removed, and the voiced speech frames are retained and output for further processing (e.g., feature extraction in operation 450).

Figure 5B:
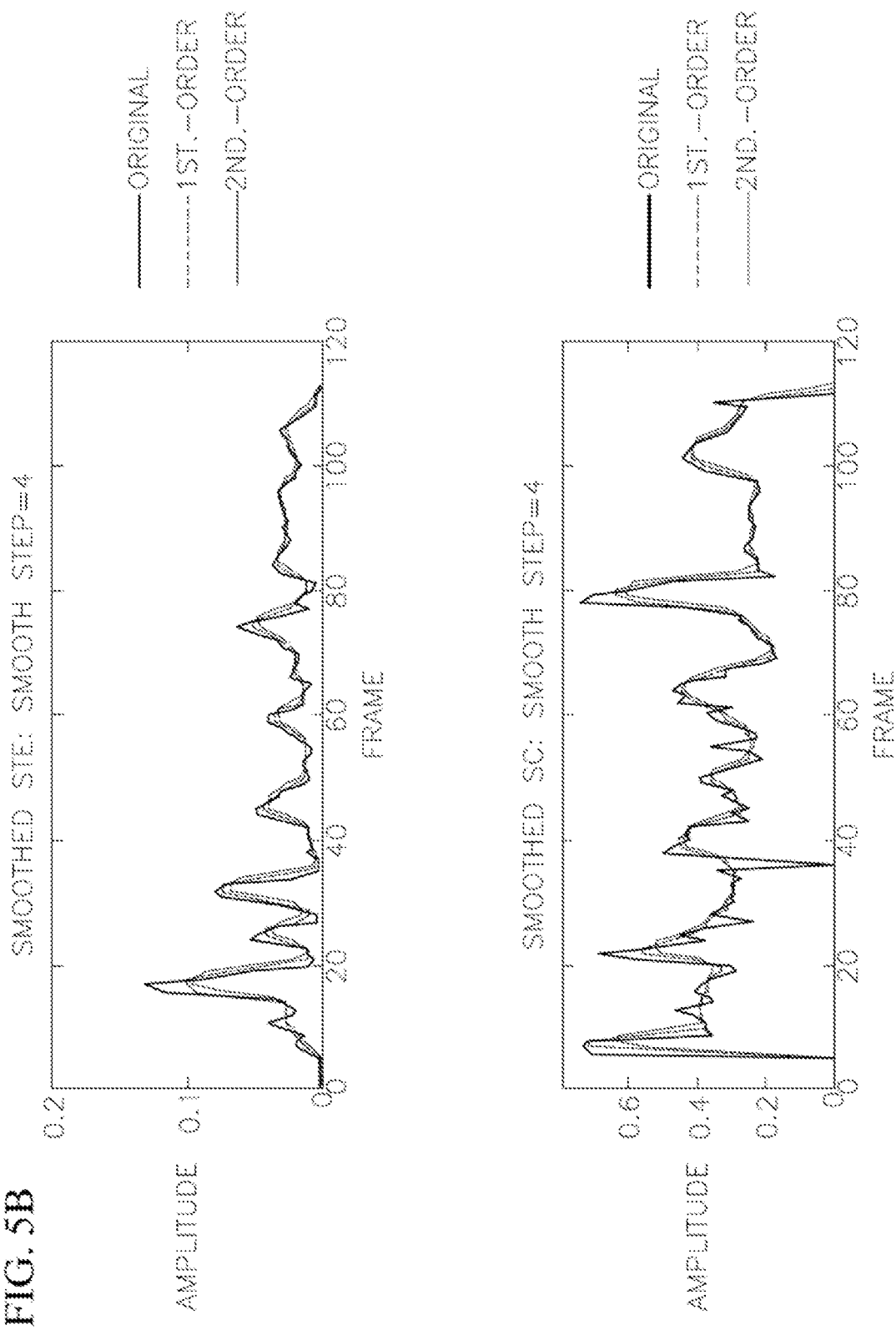
FIGS. 5B and 5C illustrate examples of applying different median filter smoothing step sizes to Short Time Energy (STE) and Spectral Centroid (SC) according to one embodiment of the present invention.
Figure 5C:
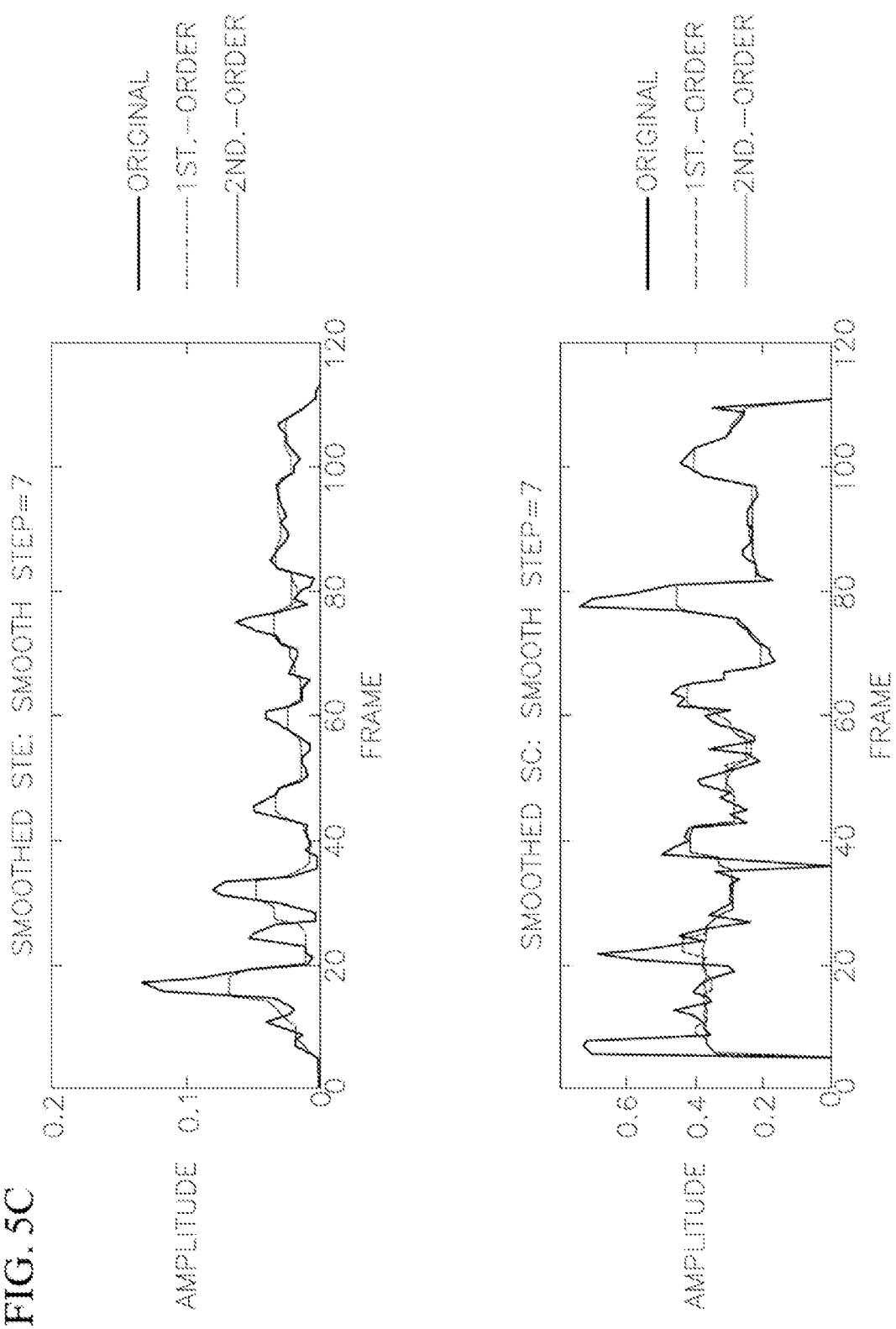

In some embodiments, these thresholds are adjusted to be high to enforce a stricter VAD algorithm and to improve the quality of the captured voiced sections. In one embodiment, this is achieved by tuning the signal median smoothing parameters, such as step size and smoothing order, as well as setting the thresholds $T_E$ and $T_C$ as a weighted average of the local maxima in the distribution histograms of the short-term energy and spectral centroid respectively. FIGS. 5B and 5C illustrate examples of applying different median filter smoothing step sizes to Short Time Energy (STE) and Spectral Centroid (SC) according to one embodiment of the present invention. FIG. 5B illustrates smoothed STE and smoothed SC with a step size of 4 and FIG. 5C illustrates smoothed STE and smoothed SC with a step size of 7. A larger step size (e.g. 7) and order (e.g. 2) are used in order to achieve stricter VAD. As shown in FIGS. 5B and 5C, the first order and the second order are substantially reduced in when the step size is 7 compared to when the step size is 4.

Feature Extraction

According to one embodiment of the present invention, the feature extractor 174 extracts 39-dimensional Mel-Frequency Cepstral Coefficients (MFCCs) with delta and double delta from the preprocessed speech received from the preprocessor 172. In one embodiment, the features are generated using a technique described in Daniel P. W. Ellis, "PLP and RASTA (and MFCC, and inversion) in Matlab," 2005.

Figure 6A:
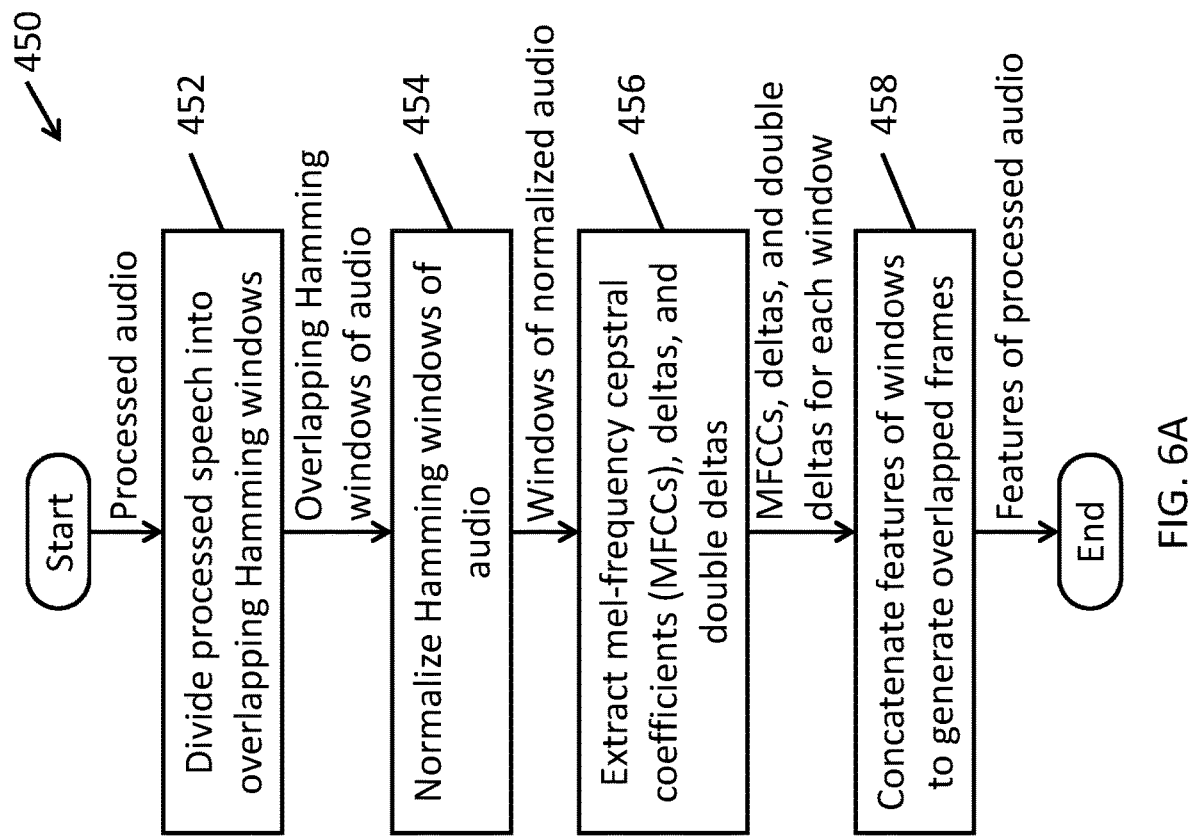
FIG. 6A is a flowchart of a method for feature extraction according to one embodiment of the present invention.

FIG. 6A is a flowchart of a method for feature extraction according to one embodiment of the present invention.

Figure 6B:
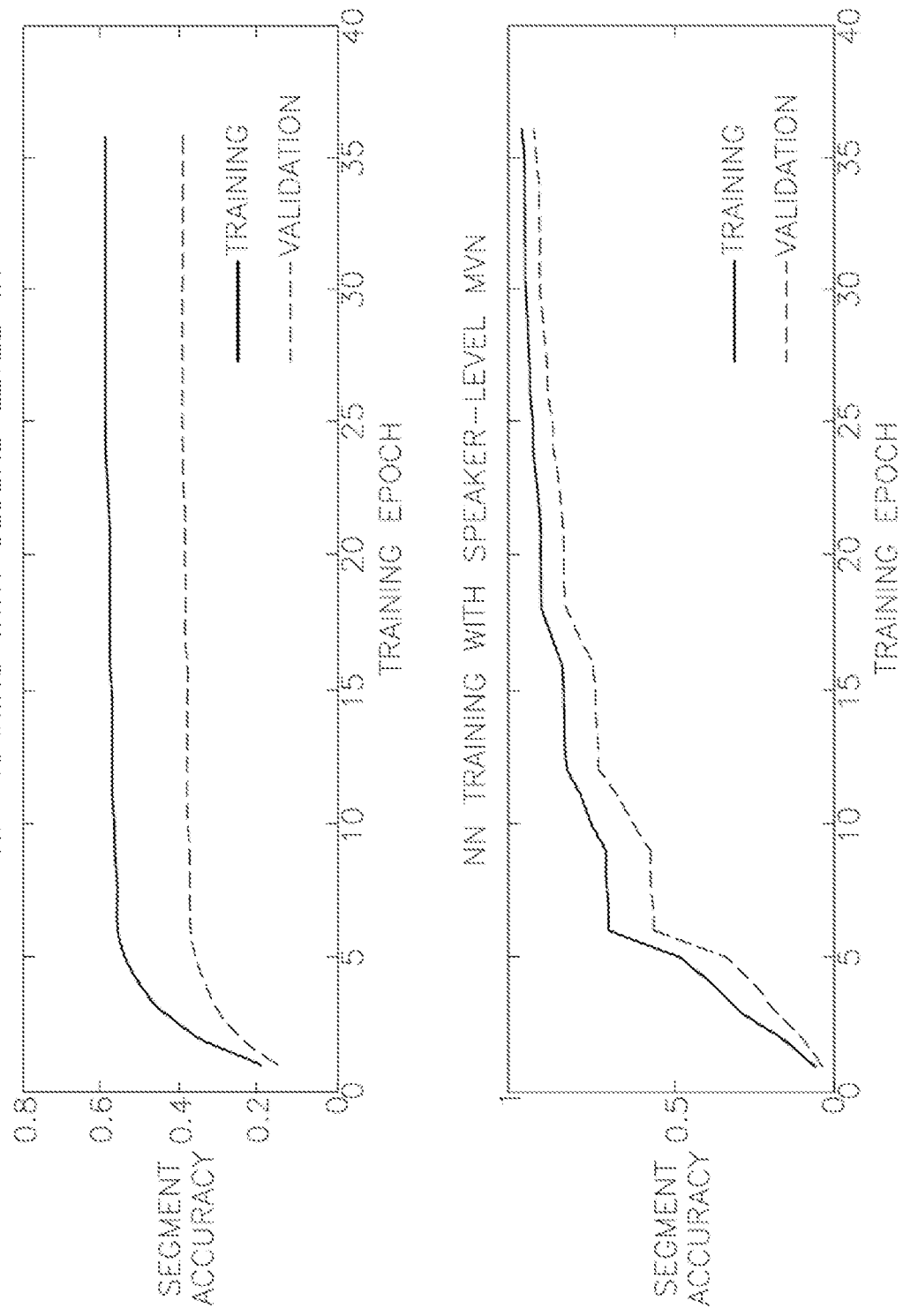
FIG. 6B includes two graphs, the upper graph showing Neural Network training with global-level mean-variance normalization (MVN) and the lower graph showing neural network training with speaker-level MVN in a speaker recognition system according to one embodiment of the present invention.

In one embodiment, in operation 452, the feature extractor 174 divides the processed speech into overlapping 25 ms Hamming windows which hop every 10 ms. Then, in operation 454, the feature extractor normalizes the features of each speaker with its own mean and variance (speaker-level mean-variance normalization, or SMVN), instead of using the overall mean and variance (global-level mean-variance normalization, or GMVN). FIG. 6B includes two graphs, the upper graph showing Neural Network training with global-level MVN and the lower graph showing neural network training with speaker-level MVN in a speaker recognition system according to one embodiment of the present invention. As seen in FIG. 6B, SMVN though converges more slowly, but helps to achieve better feature frame level training and validation accuracies (e.g., GMVN does not exceed 60% accuracy on the training set and fails to reach even 40% on the validation set, whereas SMVN reaches accuracy exceeding 80% on both the training set and the validation set). This is counter-intuitive, because SMVN overlaps speaker patterns on top of each other. However, using SMVN can match the instances of patterns from the same speaker better than GMVN as the training progresses.

In one embodiment, in operation 456, the feature extractor 174 extracts Mel-Frequency Cepstral Coefficients (MFCC) with delta and double delta using a technique described in Daniel P. W. Ellis, "PLP and RASTA (and MFCC, and inversion) in Matlab," 2005, as noted above. Generally, MFCCs can be derived for a window of a signal (e.g., one of the Hamming windows) by computing a Fourier transform of the signal within the window, mapping the powers of the spectrum onto the mel scale using triangular overlapping windows, computing logs of the powers (as indicated by the Fourier transform) at each of the mel frequencies, computing the discrete cosine transform of the mel log powers as if it were a signal, and extracting the amplitudes of the resulting spectrum as the MFCCs. The delta (first derivative) and double delta (second derivative) features correspond to the first order and second order window-to-window (or frame-to-frame) differences in the coefficients.

Figure 6C:
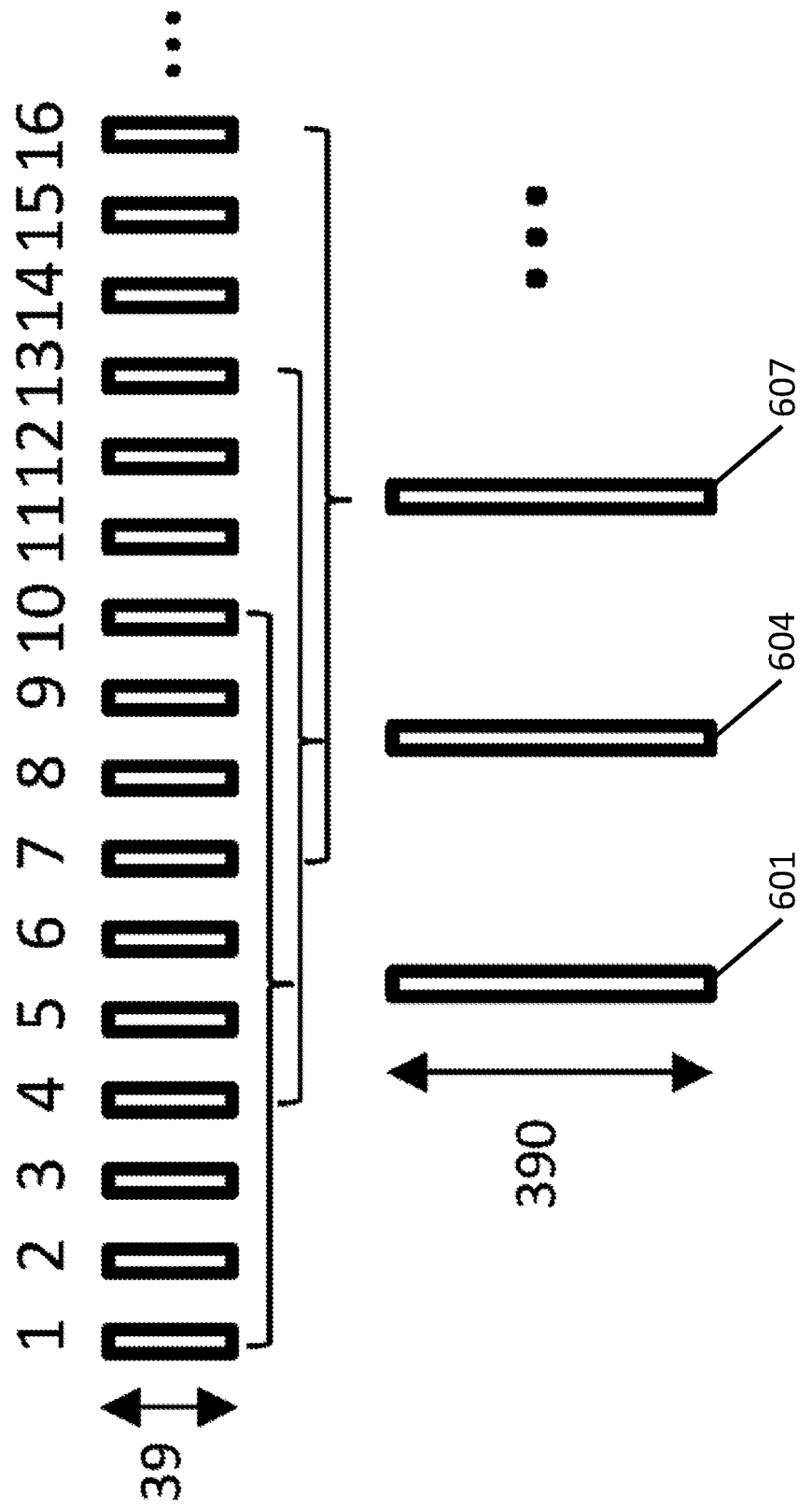
FIG. 6C is a graphical depiction of concatenating feature frames according to one embodiment of the present invention.

To capture the transition patterns within longer durations, according to one embodiment, in operation 458, the feature extractor 174 concatenates the 39-dimensional feature windows to form overlapped longer frames. In one embodiment, 10 adjacent windows (each spaced 10 ms apart due to the hop size for a total of 100 ms) were concatenated with hop size of 3 windows (30 ms) as shown in FIG. 6C. FIG. 6C is a graphical depiction of concatenating feature windows according to one embodiment of the present invention. As shown in FIG. 6C, the 39 features of each of first 10 adjacent windows (labeled 1 through 10) are concatenated to generate a first feature vector 601 that includes 390 features (39× 10=390). Advancing a hop size number of windows, the 39 features of each of the next set of 10 adjacent windows (labeled 4 through 13) are concatenated to generate a second feature vector 604 of 390 features. Likewise, the features of adjacent windows 7 through 16 are concatenated to form a third feature vector 607 of 390 features. As such, the feature vectors 601, 604, and 607 refer to overlapping sets of underlying windows (so long as the hop size is less than the number of frames that are concatenated).

Neural Network Speaker Classifier

In one embodiment, the concatenated features (e.g., the 390 dimensional feature vectors generated by the feature extractor 174) are used as the input to a speaker classifier 176. In one embodiment, the speaker classifier 176 is implemented using a multi-class neural network configured to compute K separate binary classifications, where K is the number of speakers enrolled in the speaker classification system.

Assuming that the multi-class neural network has already been trained to classify a given feature vector as corresponding to one of a plurality of enrolled speakers, supplying a feature vector to the multi-class neural network and applying forward propagation will generate a classification of the feature vector (e.g., output K confidence scores, one for each of the K classes or enrolled speakers, indicating a confidence that the supplied feature vector corresponds to the corresponding enrolled speaker).

Training and Parameter Selection

The neural network may be trained using standard techniques for training neural networks, such as backpropagation. According to one embodiment, given M samples, K output classes, and L layers, including input, output and all hidden layers in between, the cost function for the back-propagation algorithm can be formulated as:

$$J(\Theta) = -\frac{1}{M}\left[\sum_{m=1}^{M}\sum_{k=1}^{K}(y_k^{(m)}\log(h_\theta(x^{(m)})_k) + (1-y_k^{(m)})\log(1-h_\theta(x^{(m)})_k))\right] + \frac{\lambda}{2M}\sum_{l=1}^{L-1}\sum_{i=1}^{s_l}\sum_{j=1}^{s_{l+1}}(\theta_{ji}^{(l)})^2$$

where $h_\theta(x^{(m)})_k$ is the k-th output of the final layer, given m-th input sample $x^{(m)}$, and $y_k^{(m)}$ is its corresponding target label. The second half of the above cost function is the regularization factor to prevent or reduce the effect of over-fitting, where $\lambda$ is the regularization parameter and $\theta_{ji}^{(l)}$ is the j-th row, i-th column element of the weight matrix $\Theta^{(l)}$ between l-th and (l+1)-th layers, in other words, the weight from the i-th node in the l-th layer to the j-th node in (l+1)-th layer.

In some embodiments of the present invention, the training is performed using the TIMIT Acoustic-Phonetic Continuous Speech Corpus with 8K sampling rate. The TIMIT corpus includes 326 male speakers from eight different dialect region. For each speaker in the TIMIT corpus, there are ten data files containing one sentence each with duration about 2.5 seconds. They are from 3 categories: "SX" (5 sentences), "SI" (3 sentences) and "SA" (2 sentences).

In the experiment, the data were first sorted alphabetically by speaker name in their dialect region folders, then combined to form a list of data containing 326 speakers. They are then divided into 2 groups: first 200 speakers (group A) and remaining 126 speakers (group B). For speaker classification "SX" sentences in group A are used to train the text-independent Neural Network Speaker Classifier (NNSC), while the "SA" and "SI" sentences in group A were used to test.

For speaker verification, since it is based on NNSC, only "SA" and "SI" sentences were used to avoid overlapping with any training data used in model training. The speakers in group A were used as in-domain speakers, and speakers in group B were used as out-of-domain speakers (imposters).

As an example, in one embodiment, there is only one hidden layer (L=3) with 200 nodes ($s_2$=200), the input feature dimension is 390 ($s_1$=390) (corresponding to the 390 features of the feature vectors extracted by the feature extractor 174), and the speaker classifier was trained with data from 200 speakers ($s_3$=K=200). Therefore, the network structure is 390:200:200, with weight matrices $\theta^{(1)}$ (200× 391) and $\theta^2$ (200×201). The additional column is a bias vector, which is left out in regularization, because the change of bias is unrelated to the over-fitting that is mitigated by the regularization. In this example, the regularization part in the above cost function can be instantiated as $$\sum_{l=1}^{L-1}\sum_{i=1}^{s_{[l]}}\sum_{j=1}^{s_{[l+1]}} (\theta_{ji}^{(l)})^2 = \sum_{i=1}^{390}\sum_{j=1}^{200} (\theta_{j,i}^{(l)})^2 + \sum_{i=1}^{200}\sum_{j=1}^{200} (\theta_{j,i}^{(2)})^2.$$

In more detail, the model training module 175 may perform the training of the speaker model (the neural network) using forward-backward propagation. Denoting $z^{(l)}$ and $a^{(l)}$ as the input and output of the l-th layer, in one embodiment, the sigmoid function:

$$a^{(l)} = g(z^{(l)}) = \frac{1}{1+e^{-z^{(l)}}}$$

is used as the activation function of the neural network, and the input $z^{(l+1)}$ of the (l+1)-th layer can be transformed from the output $a^{(l)}$ of the l-th layer, using $z^{(l+1)} = \theta a^{(l)}$. Then, $h_\theta(x)$ can be computed through forward propagation:

$$x = a^{(1)} \rightarrow z^{(2)} \rightarrow a^{(2)} \rightarrow \ldots \rightarrow z^{(L)} \rightarrow a^{(L)} = h_\theta(x).$$

In one embodiment, the weight matrix $\theta^{(l)}$ is randomly initiated using continuous uniform distribution between (−0.1, 0.1) and then trained through backward propagation of $\partial J/\partial \theta_{j,i}^{(l)}$, by minimizing $J(\theta)$ using Rasmussen's conjugate gradient algorithm, which handles step size (learning rate) automatically using a slope ratio.

Figure 6D:
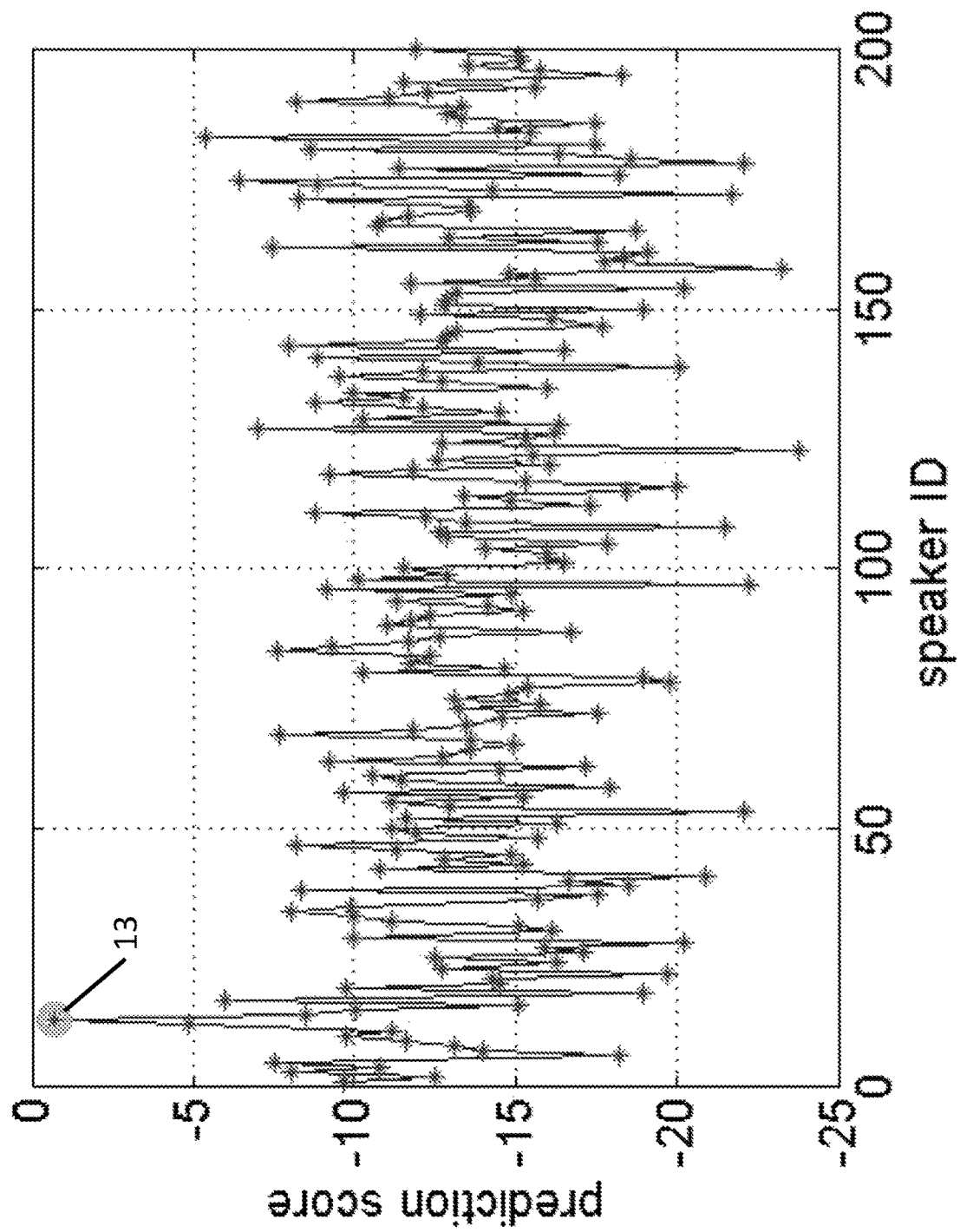
FIGS. 6D and 6E provides examples of file-level prediction score as computed using a speaker recognition system according to an embodiment of the present invention of the speaker with speaker ID 13 when predicting from a training audio file and a testing audio file, respectively.
Figure 6E:
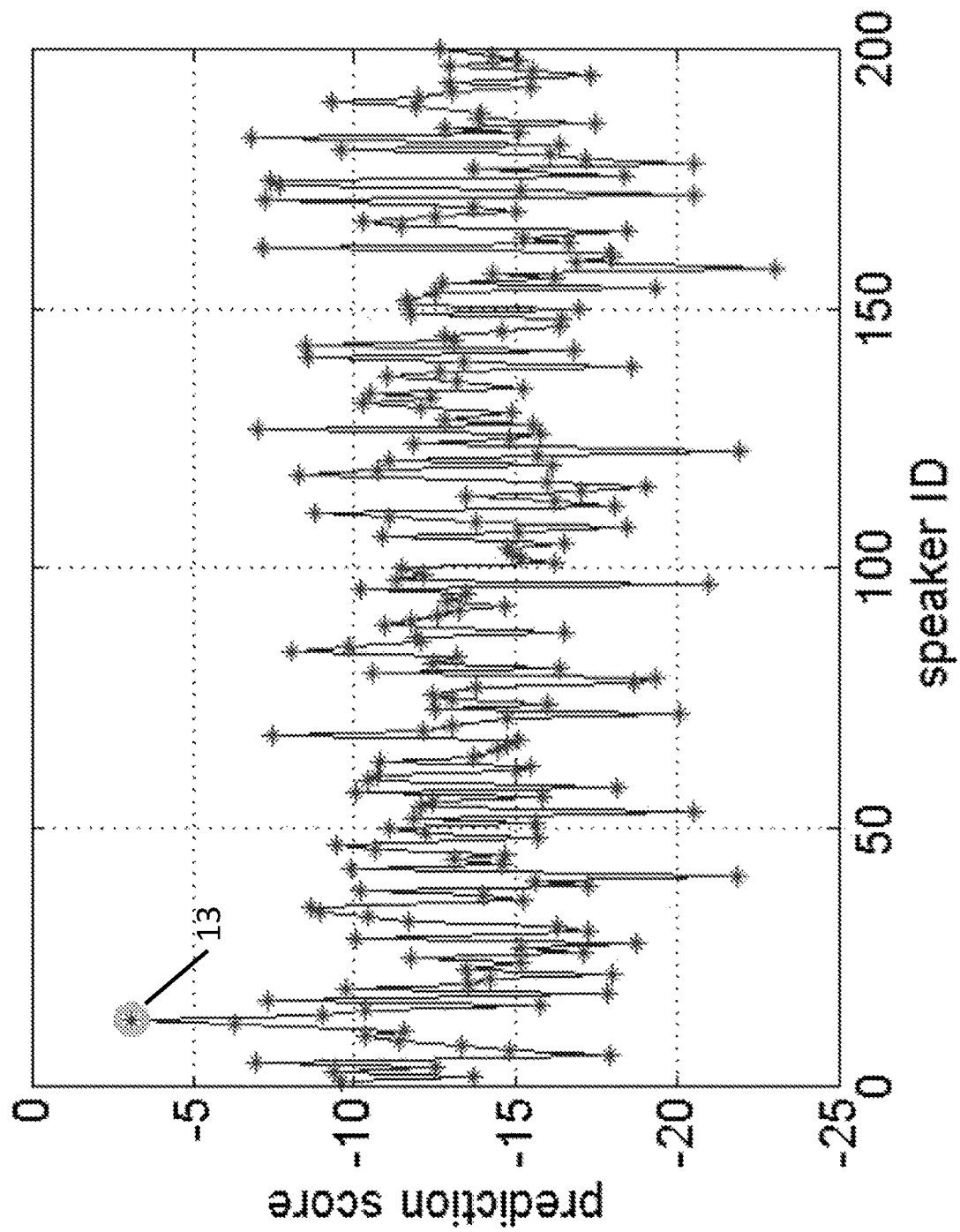

In evaluating the classifier performance, the sigmoid output of the final layer $h_\theta(x^{(m)})$ is a K-dimensional vector, where each element is in the range of (0,1). The output serves as the "likelihood" or "confidence" score to indicate how likely it is to classify m-th input frame into one of the K speakers. The speaker classification can be predicted by the sum of log likelihood of the M input frames (prediction scores), and the predicted speaker ID k* is the index of its maximum:

$$k^* = \underset{k\in[1,K]}{\mathrm{argmax}} \left( \sum_{m=1}^{M} \log(h_\theta(x^{(m)})_k) \right)$$

where M can range from 1 to the entire frame length of the testing file. If M=1, the accuracy achieved is based on individual frames, each of which is 100 ms (window duration $T_{win}$ in feature concatenation) with 30 ms of new data, compared with the previous frame. On the other hand, if M is equal to the total number of frames in file, the accuracy is file-based. (In experiments described below, the average duration of sentences or file length in was about 2.5 seconds.) In general, larger M leads to higher accuracy. Given the best model available with the network structure 390:200:200, FIGS. 6D and 6E provides examples of file-level prediction score as computed using a speaker recognition system according to an embodiment of the present invention of the speaker with speaker ID 13 when predicting from a training audio file and a testing audio file, respectively. It shows the peak of positives (labeled "13") is slightly dropped but still distinguishable enough to all other negatives, from the file in the training set (FIG. 6D), to a file in the testing set (FIG. 6E).

Using this model, the file-level training and testing accuracies at 200 speakers size are both 100%, as indicated in Table 1, below. The performance on the training data is merely presented to illustrate the drop in accuracy when operating on the test data.

TABLE 1

| Dataset | Accuracy (%) | | Frames (sec.) needed for 100% accuracy | | |
|---|---|---|---|---|---|
| | Frame | File | Min | Mean | Max |
| Train | 93.29 | 100 | 2 (0.13 s) | 3.23 (0.17 s) | 5 (0.22 s) |
| Test | 71.42 | 100 | 6 (0.25 s) | 13.55 (0.48 s) | 37 (1.18 s) |

As shown in Table 1, the frame-level testing accuracy is 71.42%, which indicates that, 71.42% of the frames in the testing set can be classified correctly using only a single frame (each frame having a duration as short as about 0.1 seconds). Table 1 also shows the minimum, mean, and maximum number of consecutive feature frames needed and their corresponding durations in order to achieve 100% accuracy, evaluated through all files in both training and testing datasets. Because the next frame provides only 30 ms (hop duration $T_{hop}$ in the concatenated features) additional information, compared with the current frame, given the number of frames needed N, the formula to compute the corresponding required duration T is:

$$T = (N-1) \times T_{hop} + 1 \times T_{win}$$

where $T_{hop}$ is the duration of the hop and $T_{win}$ is the duration of the window. With the above formula, achieving 100% accuracy on the test set requires only an average (mean) of 13.55 frames (0.48 seconds) of audio data.

According to one embodiment of the present invention, the parameters of the neural network are selected based on a grid search on the number of hidden layers (e.g., one hidden layer or two hidden layers), and the number of nodes in each hidden layer (e.g., 50, 100, 200, or 400 nodes). Once a network structure is selected, the model training module 175 conducts the training with a regularization parameter λ in the cost function J(θ) which is iteratively reduced from 3 to 0 through the training process. The dynamic regularization scheme may be used to avoid or mitigate over-fitting and allow more iterations to reach a refined model with better performance.

According to one embodiment of the present invention, the model training module 175 terminates the training once the testing frame accuracy does not improve by more than 0.1% in the previous two training iterations. In some experiments, it takes 500 to 1,000 iterations to reach this state. In some embodiments, the training set includes 200 speakers with 20 seconds of speech each.

Speaker Enrollment

As shown in FIG. 3, in one embodiment, adding a new speaker to be recognized by the system (e.g., adding to the 200 speakers already trained) includes receiving enrollment data from the new speaker (e.g., sample audio from the speaker and a speaker identifier), and then retraining the classifier (e.g., the K-class neural network) using the previous training data along with the newly received data, where the classifier is now configured output an additional class (e.g., 201 classes). The speaker enrollment data may be received from an interactive media response system 122 that is configured to guide a new speaker through the enrollment process.

Speaker Verification

In some embodiments, the system for speaker classification described above is applied to perform speaker verification. In speaker verification, the assumption that any input speaker will be one of the in-domain speakers (e.g., among the speakers used to train the speaker classifier) is removed. In particular, the speaker verification system receives audio speech input from a speaker along with an allegation that the speaker is a particular enrolled speaker (e.g., enrolled speaker k). However, it is possible that the audio speech input was produced by a different enrolled speaker (e.g., an enrolled speaker other than enrolled speaker k) or that the audio speech input was produced by an unenrolled speaker (a speaker who is not among the K enrolled speakers).

When an imposter alleges to be speaker k, it is possible that the highest output score from the speaker classifier 176 will be associated with k-th output node, because the imposter sounds more similar to speaker k than any of the other K−1 enrolled (in-domain) speakers. Therefore, in order to provide speaker verification, according to one embodiment of the present invention, a threshold is applied to determine if the speaker is similar enough to the targeting speaker to be verified as speaker k.

According to one embodiment of the present invention, the mean K-dimensional output prediction vector over feature frames for client speaker k, given features $x_l$ of speaker l is given by:

$$O(k, l) = \frac{1}{M} \sum_{m=1}^{M} \log(h_\theta(x_l^{(m)})_k),$$

where M is the number of frames in the feature to be tested (e.g., the feature vector from the audio received with the verification request).

In the experiment described above, the client speakers are the first 200 male speakers in TIMIT (K=200), and the imposters (out-of-domain) are the remaining 126 male speakers in TIMIT (L=126). In positive verification, where l=k, the k-th value on O(k,k) ($O_k(k,k)$) should be high (comparing speaker k against itself); while in negative verification, where l ∈[1,L], $O_k(k,l)$ should be low (comparing speaker k against any imposter l). If $O_k(k,k) >$ any$(O_k(k,l))$, $l \in [1,L]$, then, the k-th speaker can be correctly verified. In some embodiments, O(k,k) and O(k,l) are normalized over K output node dimensions, where the normalized versions may be expressed by:

$$O'(k, k) = \frac{O(k, k)}{\sum_{k=1}^{K} O(k, k)} \quad O'(k, l) = \frac{O(k, l)}{\sum_{k=1}^{K} O(k, l)}.$$

Figure 7:
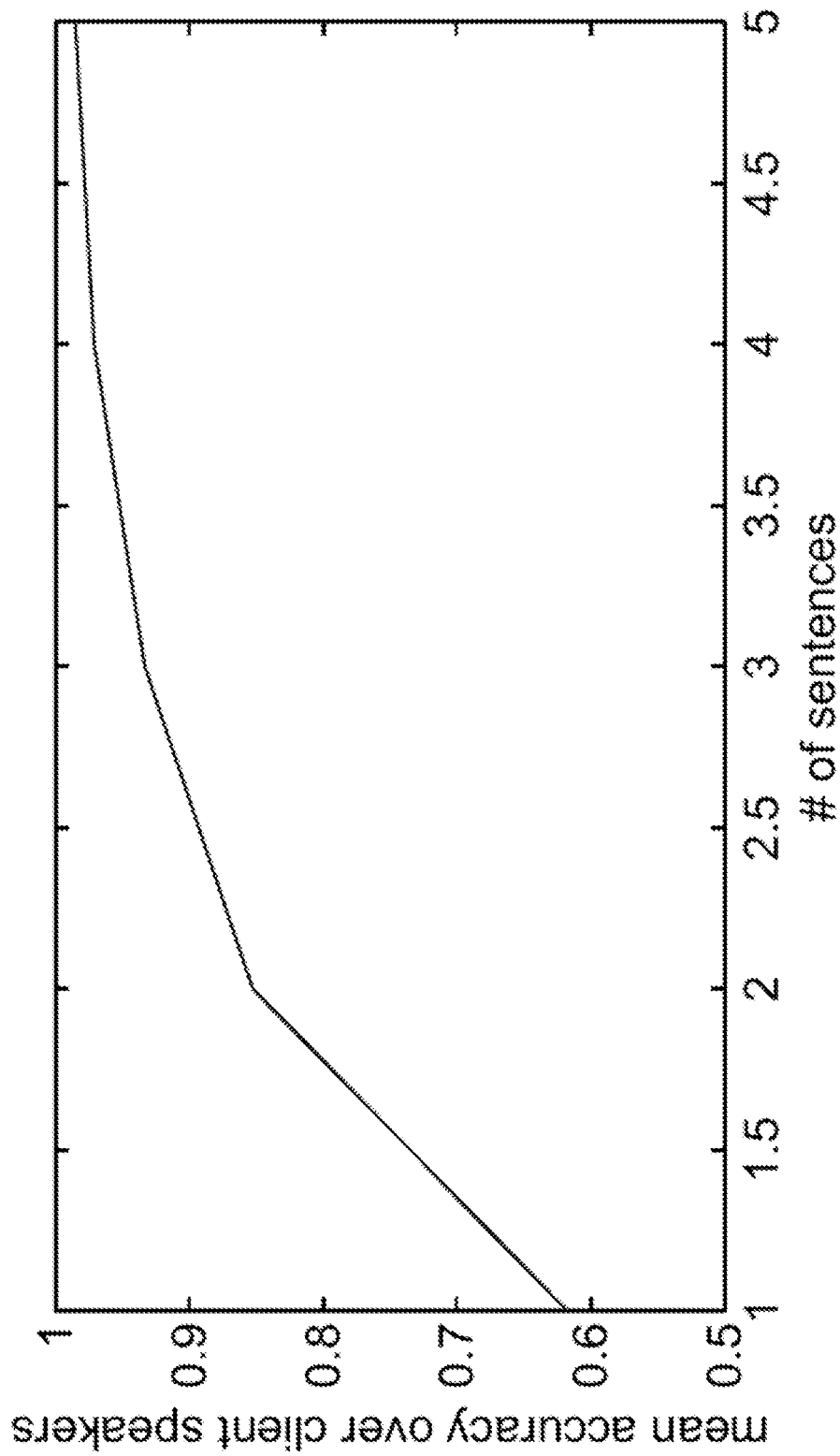
FIG. 7 is a graph illustrating the verification accuracy (one in-domain speaker versus 126 out-of-domain speakers) as the length of the input increases (e.g., in number of sentences), averaged over all 200 in-domain speakers according to one embodiment of the present invention.

In some embodiments of the present invention, verification accuracy is improved by penalizing speakers with strong competing speakers. FIG. 7 is a graph illustrating the verification accuracy (one in-domain speaker versus 126 out-of-domain speakers) as the length of the input increases (e.g., in number of sentences), averaged over all 200 in-domain speakers according to one embodiment of the present invention. For example, the mean accuracy is 61.7% when speakers are tested with individual files (from the TIMIT corpus) and 82.25% when tested with a combination of two files $$\left( \binom{5}{2} \right) = 10$$

cases). The sentences each have a duration of about 2.5 seconds, so it is similar to the accuracy with testing duration of 2.5 seconds, 5, seconds, etc. For each of the 200 client speakers. the accuracy is binary—either 1 (e.g., the equation $O_k(k,k)>$any$(O_k(k,l))$ is satisfied) or 0 otherwise.

In some embodiments, the threshold for speaker verification is set on a speaker-by-speaker basis, in other words, the threshold may be speaker specific. In one embodiment, the speaker-specific thresholds are computed by finding the Gaussian distributions of the positive (testing speaker is one of the enrolled speakers) and negative (testing speaker is one of the imposters) samples, using Bayes' theorem.

Figure 8:
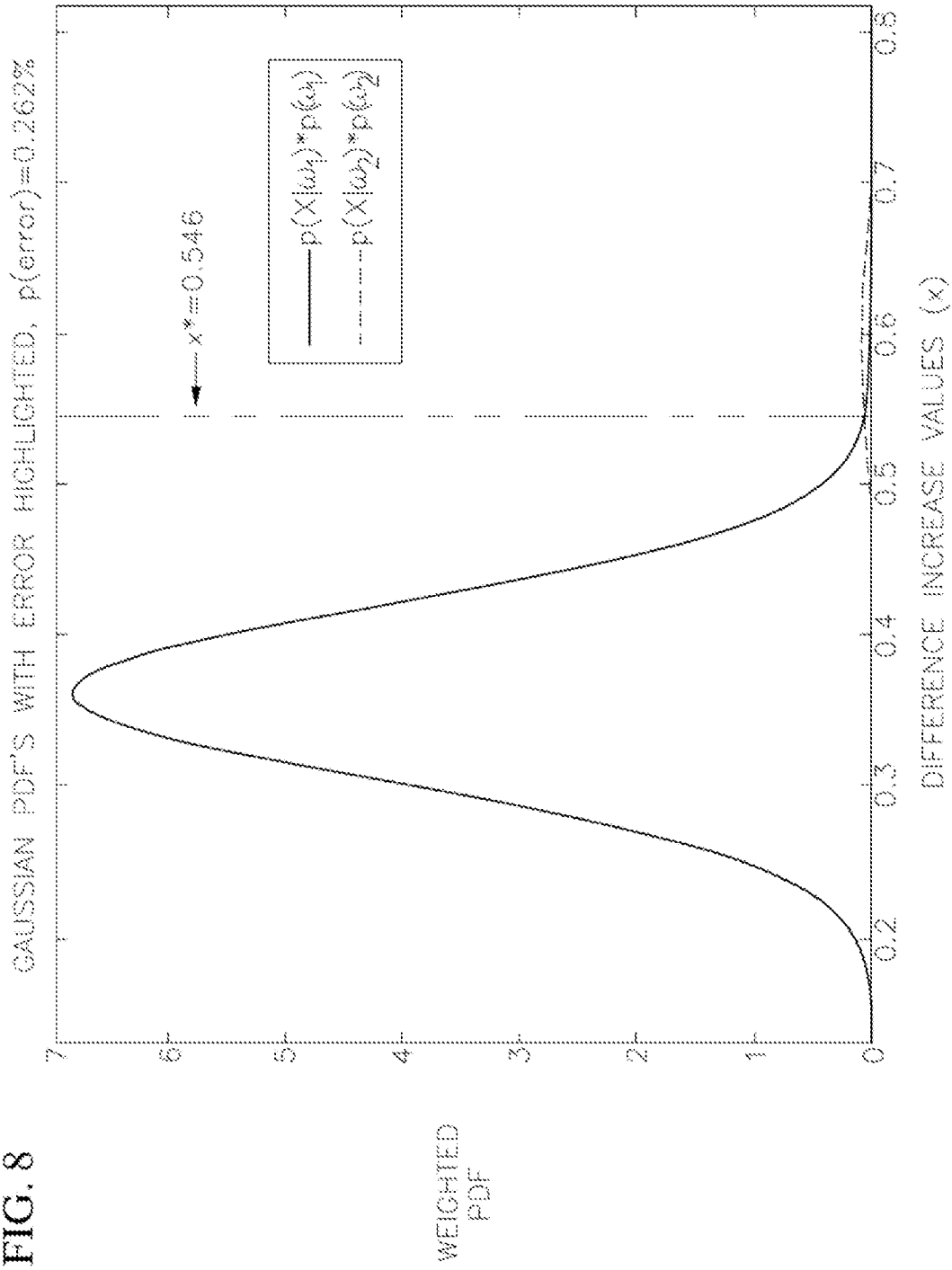
FIG. 8 is a graph showing an example of speaker verification thresholding with two Gaussian distributions of positive and negative samples in an experiment according to one embodiment of the present invention.

FIG. 8 is a graph showing an example of speaker verification thresholding with two Gaussian distributions of positive and negative samples in an experiment according to one embodiment of the present invention. Because the positive and negative samples are extremely skewed in the experiment (with one positive example to 126 negative examples or imposters), the distribution for the positive samples has a very low prior and is essentially invisible in FIG. 8.

However, the estimated threshold, which is the intersection of the two Gaussian curves can be found by solving the below equation using, for example, the root finding method, which rearranges the below equation into the quadratic function of the form $ax^2+bx+c=0$ and then solving for x (which represents the speaker specific threshold $T_k$) using, for example, the quadratic equation.

$$\frac{p_1}{\sigma_1} e^{\frac{(x-u_1)^2}{2\sigma_1^2}} = \frac{1-p_1}{\sigma_2} e^{\frac{(x-u_2)^2}{2\sigma_2^2}}$$

In FIG. 8, the intersection of the two Gaussians is indicated by the vertical line labeled x*=0.546, indicating that the speaker-specific threshold $T_k$ is to be set at 0.546.

With the speaker-specific thresholds $T_k$, k ∈[1,K], the output normalized prediction vector is shifted by:

$O'(k,l) \rightarrow O'(k,l) - T_k$, $l \in \{k, [1,L]\}$

Figure 9:
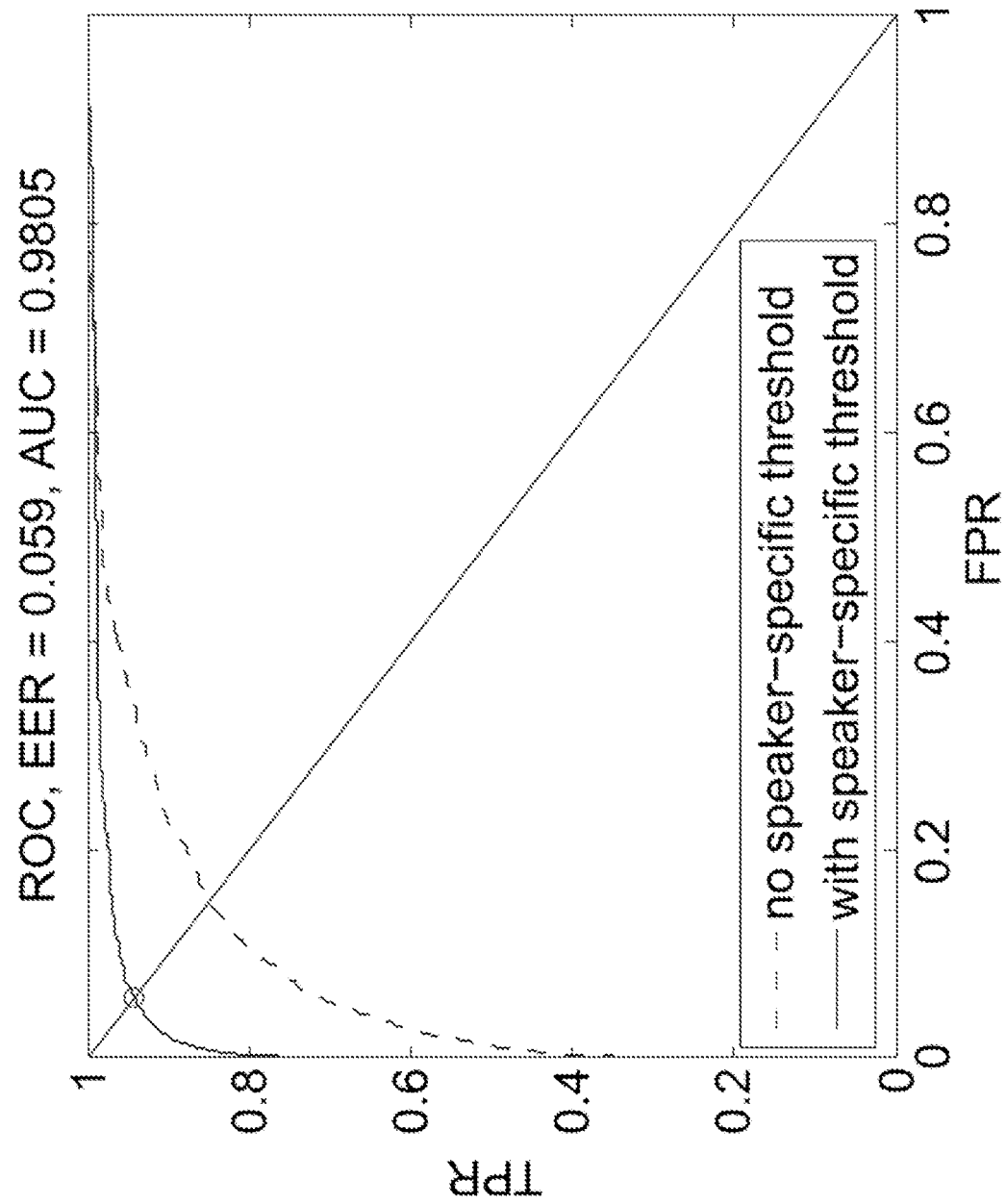
FIG. 9 is a graph showing the receiver operating characteristic (ROC) when verifying a speaker with two files (e.g., about 5 seconds of audio), both with and without using a speaker-specific threshold according to embodiments of the present invention.

The receiver operating characteristic (ROC) curve may be computed to find the Equal Error Rate (EER), which is a common performance indicator to evaluate biometric systems. The EER is equal to the False Positive Rate (FPR), when the sum of the false positive rate and the true positive rate is equal to 1 (FPR+TPR=1). FIG. 9 is a graph showing the receiver operating characteristic (ROC) when verifying a speaker with two files (e.g., about 5 seconds of audio), both with and without using a speaker-specific threshold according to embodiments of the present invention. As shown in FIG. 9, by offsetting outputs with speaker-specific thresholds, the EER is reduced from 14.9% to 5.9%. Another metric, Area Under Curve (AUC) is 98.05%, and the global threshold corresponding to this best EER is −0.0941. As such, speaker verification is improved in embodiments of the present invention making use of speaker-specific thresholds.

As such, various embodiments of the present invention provide improved systems and methods for speaker recognition and speaker verification, demonstrating a 100% classification rate for 200 speakers using about 1 second of audio and less than 6% Equal Error Rate when verifying 200 in-domain speakers with 126 imposters using about 5 seconds of data in speaker verification.

Aspects of embodiments of the present achieve the improvements through a variety of technical improvements, including feature engineering (such as VAD and silence removal, speaker level mean-variance normalization, feature concatenation to capture transitional information, and the like), speaker classification (such as neural network configuration, model parameter selection, training with a dynamically reduced regularization parameter, and output score normalization) and speaker verification techniques (including score normalization and speaker-specific thresholding).

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 10A, FIG. 10B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 10A:
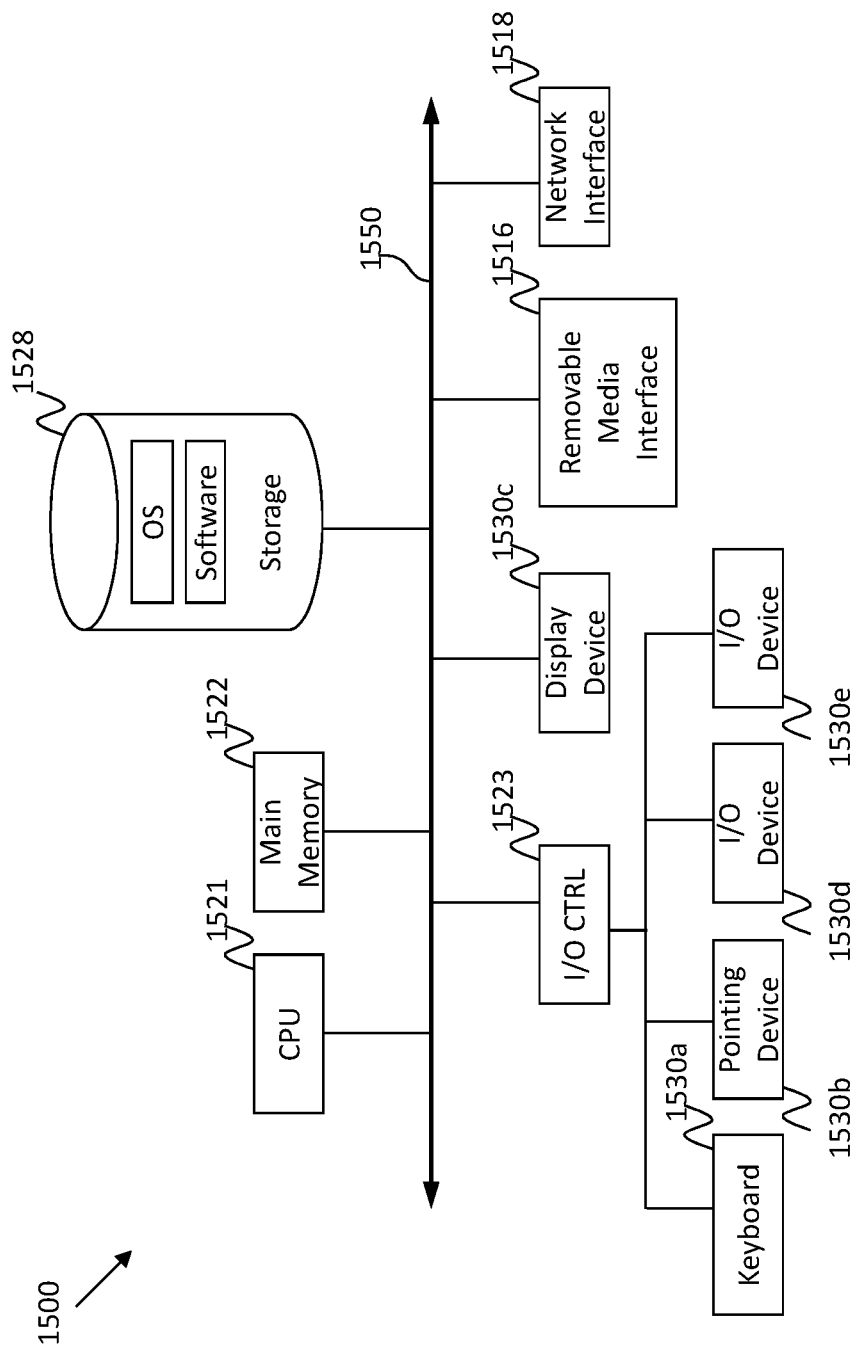
FIG. 10A is a block diagram of a computing device according to an embodiment of the present invention.
Figure 10B:
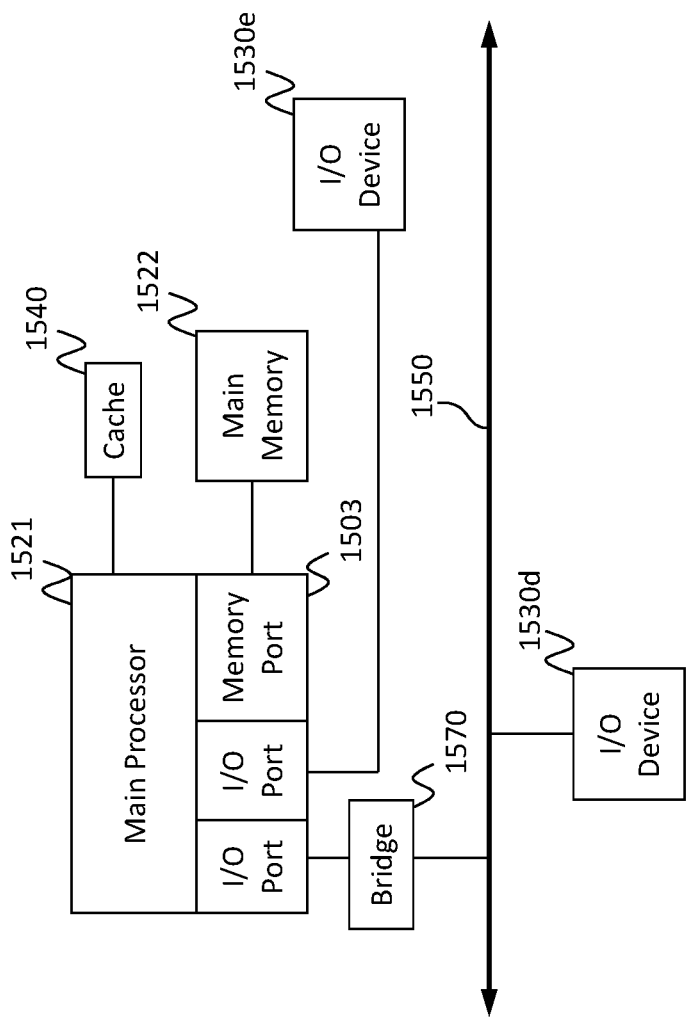
FIG. 10B is a block diagram of a computing device according to an embodiment of the present invention.

FIG. 10A-FIG. 10B depict block diagrams of a computing device 1500 as may be employed in exemplary embodiments of the present invention. Each computing device 1500 includes a central processing unit 1521 and a main memory unit 1522. As shown in FIG. 10A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 10B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 10A, the central processing unit 1521 communicates with the main memory 1522 via a system bus 1550. As shown in FIG. 10B, the central processing unit 1521 may also communicate directly with the main memory 1522 via a memory port 1503.

FIG. 10B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 10A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 10B depicts an embodiment of a computer 1500 in which the central processing unit 1521 communicates directly with I/O device 1530e. FIG. 10B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 10A, may control the I/O devices. The I/O controller may control one or more I/O devices such as a keyboard 1530*a* and a pointing device 1530*b*, e.g., a mouse or optical pen.

Referring again to FIG. 10A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect, or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 10A-FIG. 10B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 10D:
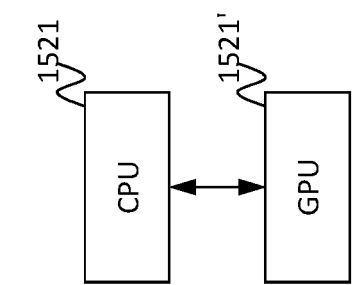
FIG. 10D is a block diagram of a computing device according to an embodiment of the present invention.
Figure 10C:
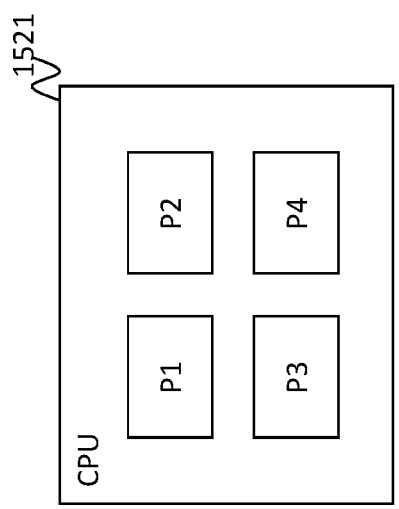
FIG. 10C is a block diagram of a computing device according to an embodiment of the present invention.

As shown in FIG. 10C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 10D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 10E:
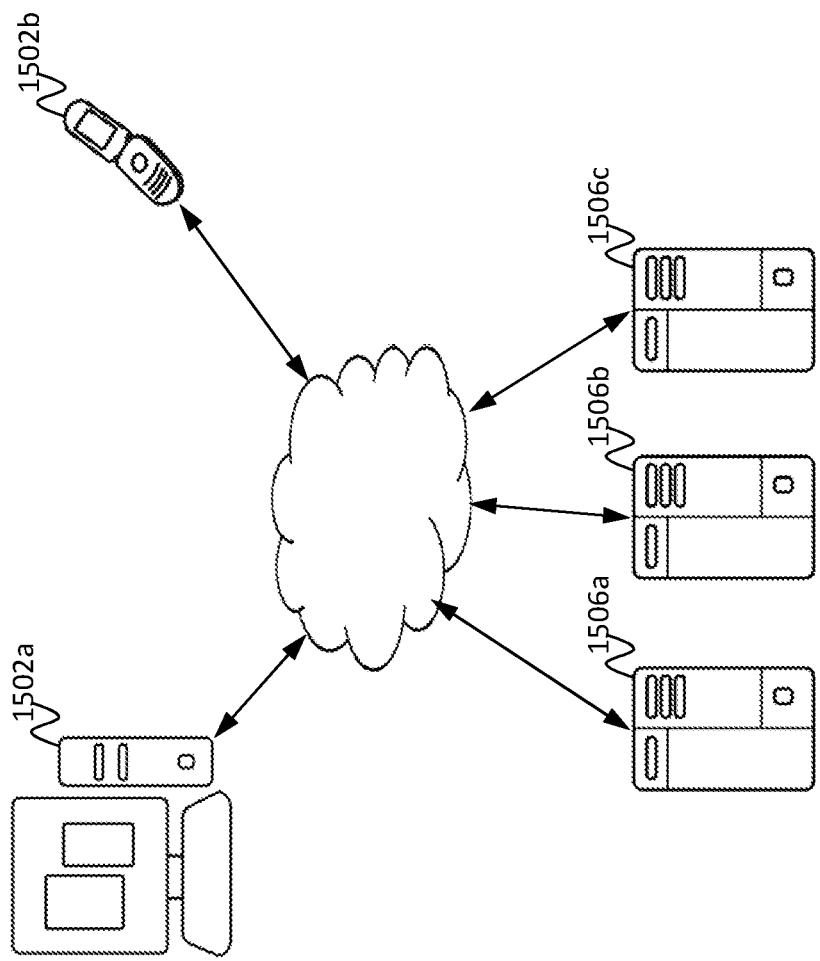
FIG. 10E is a block diagram of a network environment including several computing devices according to an embodiment of the present invention.

A computing device may be one of a plurality of machines connected by a network, or it may include a plurality of machines so connected. FIG. 10E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 10E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 10E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for classifying speakers comprises:
   receiving, by a speaker recognition system comprising a processor and memory,
   input audio comprising speech from a speaker;
   extracting, by the speaker recognition system, a plurality of speech frames containing voiced speech from the input audio, comprising retaining voiced frames from the input audio and removing unvoiced speech frames from the input audio;
   computing, by the speaker recognition system, a plurality of features for each of the speech frames of the input audio;
   computing, by the speaker recognition system, a plurality of confidence scores for the plurality of features by forward propagating the plurality of features through a trained multi-class neural network, the trained multi-class neural network being trained to compute the confidence scores, each of the confidence scores corresponding to a confidence that the speech of the input audio corresponds to speech from a corresponding one of a plurality of enrolled speakers;
   computing, by the speaker recognition system, a speaker classification result in accordance with the confidence scores; and
   outputting, by the speaker recognition system, the speaker classification result.

2. The method of claim 1, wherein the extracting the speech frames further comprises:
   dividing the input audio into the plurality of speech frames;
   computing a short term energy of each speech frame;
   computing a spectral centroid of each speech frame;
   classifying a speech frame as a voiced frame in response to determining that the short term energy of the speech frame exceeds a short term energy threshold and that the spectral centroid of the speech frame exceeds a spectral centroid threshold, and classifying the speech frame as an unvoiced speech frame otherwise; and
   outputting the retained voiced frames as the speech frames containing voiced speech, wherein the unvoiced speech frames are removed.

3. The method of claim 1, wherein the computing the plurality of features for each of the speech frames comprises:
   dividing the speech frames into overlapping windows of audio;
   normalizing each of the windows of audio;
   computing mel-frequency cepstral coefficients, deltas, and double deltas for each window; and
   computing the plurality of features from the mel-frequency cepstral coefficients, deltas, and double deltas for each window.

4. The method of claim 3 wherein the normalizing each of the windows of audio comprises applying speaker-level mean-variance normalization.

5. The method of claim 3 wherein the computing the plurality of features from the mel-frequency cepstral coefficients, deltas, and double deltas for each window comprises:
   grouping the windows into a plurality of overlapping frames, each of the overlapping frames comprising a plurality of adjacent windows;
   for each overlapping frame of the overlapping frames, concatenating the mel-frequency cepstral coefficients, the deltas, and the double deltas of the adjacent windows to generate a plurality of features of the overlapping frame; and
   outputting the features of the overlapping frames as the plurality of features.

6. The method of claim 1, wherein the trained multi-class neural network is trained by:
   receiving training data comprising audio comprising speech from a plurality of enrolled speakers, the audio being labeled with the speakers;
   extracting a plurality of features from the audio for each of the enrolled speakers; applying speaker-level mean-variance normalization to the features extracted from the audio for each of the enrolled speakers; and training the multi-class neural network to classify an input feature vector as one of the plurality of enrolled speakers.

7. The method of claim 6, wherein the training the multi-class network comprises iteratively reducing a regularization parameter of a cost function.

8. The method of claim 1, wherein the speaker classification result comprises an identification of a particular speaker of a plurality of enrolled speakers, and wherein the identification of the particular speaker is computed by identifying a highest confidence score of the plurality of confidence scores and by identifying the particular speaker associated with the highest confidence score.

9. The method of claim 1, further comprising receiving an allegation that the speaker is a particular enrolled speaker of a plurality of enrolled speakers, wherein the speaker classification result is a speaker verification indicating whether the speaker of the speech of the input audio corresponds to the particular enrolled speaker of the plurality of enrolled speakers.

10. The method of claim 9, further comprising computing the speaker verification by:

comparing the confidence score corresponding to the particular speaker to a threshold value; and outputting a speaker verification indicating that the speaker of the speech of the input audio corresponds to the particular enrolled speaker of the plurality of enrolled speakers in response to determining that the confidence score exceeds the threshold value and determining that the confidence score is higher than all other enrolled speakers.

11. A method for classifying speakers comprises:

receiving, by a speaker recognition system comprising a processor and memory, input audio comprising speech from a speaker;

extracting, by the speaker recognition system, a plurality of speech frames containing voiced speech from the input audio;

computing, by the speaker recognition system, a plurality of features for each of the speech frames of the input audio;

computing, by the speaker recognition system, a plurality of recognition scores for the plurality of features;

computing, by the speaker recognition system, a speaker classification result in accordance with the recognition scores; and outputting, by the speaker recognition system, the speaker classification result, further comprising receiving an allegation that the speaker is a particular enrolled speaker of a plurality of enrolled speakers, wherein the speaker classification result is a speaker verification indicating whether the speaker of the speech of the input audio corresponds to the particular enrolled speaker of the plurality of enrolled speakers, further comprising computing the speaker verification by:

comparing the recognition score corresponding to the particular speaker to a threshold value; and outputting a speaker verification indicating that the speaker of the speech of the input audio corresponds to the particular enrolled speaker of the plurality of enrolled speakers in response to determining that the recognition score exceeds the threshold value and determining that the recognition score is higher than all other enrolled speakers, and wherein the threshold comprises a speaker-specific threshold, and wherein the speaker-specific threshold is computed by solving for an intersection between a first Gaussian distribution representing the probability that the speaker of the input audio is one of the enrolled speakers and a second Gaussian distribution representing the probability that the speaker of the input audio is not one of the enrolled speakers.

12. A system for classifying speakers comprising:

a processor; and memory storing instructions that, when executed by the processor, cause the processor to:

receive input audio comprising speech from a speaker;

extract a plurality of speech frames containing voiced speech from the input audio, comprising retaining voiced frames from the input audio and removing unvoiced speech frames from the input audio;

compute a plurality of features for each of the speech frames of the input audio; compute a plurality of confidence scores for the plurality of features by forward propagating the plurality of features through a trained multi-class neural network, the trained multi-class neural network being trained to compute the confidence scores, each of the confidence scores corresponding to a confidence that the speech of the input audio corresponds to speech from a corresponding one of a plurality of enrolled speakers;

compute a speaker classification result in accordance with the confidence scores; and output the speaker classification result.

13. The system of claim 12, wherein the memory further stores instructions that, when executed by the processor, cause the processor to extract the speech frames further by:

dividing the input audio into the plurality of speech frames;

computing a short term energy of each speech frame;

computing a spectral centroid of each speech frame;

classifying a speech frame as a voiced frame in response to determining that the short term energy of the speech frame exceeds a short term energy threshold and that the spectral centroid of the speech frame exceeds a spectral centroid threshold, and classifying the speech frame as an unvoiced speech frame otherwise; and outputting the retained voiced frames as the speech frames containing voiced speech, wherein the unvoiced speech frames are removed.

14. The system of claim 12, wherein the memory further stores instructions that, when executed by the processor, cause the processor to compute the plurality of features for each of the speech frames by:

dividing the speech frames into overlapping windows of audio;

normalizing each of the windows of audio;

computing mel-frequency cepstral coefficients, deltas, and double deltas for each window; and computing the plurality of features from the mel-frequency cepstral coefficients, deltas, and double deltas for each window.

15. The system of claim 14 wherein the normalizing each of the windows of audio comprises applying speaker-level mean-variance normalization.

16. The system of claim 14 wherein the computing the plurality of features from the mel-frequency cepstral coefficients, deltas, and double deltas for each window comprises:

grouping the windows into a plurality of overlapping frames, each of the overlapping frames comprising a plurality of adjacent windows;

for each overlapping frame of the overlapping frames, concatenating the mel-frequency cepstral coefficients, the deltas, and the double deltas of the adjacent windows to generate a plurality of features of the overlapping frame; and outputting the features of the overlapping frames as the plurality of features.

17. The system of claim 12, wherein the trained multi-class neural network is trained by:

receiving training data comprising audio comprising speech from a plurality of enrolled speakers, the audio being labeled with the speakers;

extracting a plurality of features from the audio for each of the enrolled speakers;

applying speaker-level mean-variance normalization to the features extracted from the audio for each of the enrolled speakers; and training the multi-class neural network to classify an input feature vector as one of the plurality of enrolled speakers.

18. The system of claim 17, wherein the training the multi-class network comprises iteratively reducing a regularization parameter of a cost function.

19. The system of claim 12, wherein the speaker classification result comprises an identification of a particular speaker of a plurality of enrolled speakers, and wherein the memory further stores instructions that, when executed by the processor, cause the processor to compute the identification of the particular speaker by identifying a highest confidence score of the plurality of confidence scores and by identifying the particular speaker associated with the highest confidence score.

20. The system of claim 12, wherein the memory further stores instructions that, when executed by the processor, cause the processor to receive an allegation that the speaker is a particular enrolled speaker of a plurality of enrolled speakers, and wherein the speaker classification result is a speaker verification indicating whether the speaker of the speech of the input audio corresponds to the particular enrolled speaker of the plurality of enrolled speakers.

21. The system of claim 20, wherein the memory further stores instructions that, when executed by the processor, cause the processor to compute the speaker verification by:

comparing the confidence score corresponding to the particular speaker to a threshold value; and outputting a speaker verification indicating that the speaker of the speech of the input audio corresponds to the particular enrolled speaker of the plurality of enrolled speakers in response to determining that the confidence score exceeds the threshold value and determining that the confidence score is higher than all other enrolled speakers.

22. A system for classifying speakers comprising:

a processor; and memory storing instructions that, when executed by the processor, cause the processor to:

receive input audio comprising speech from a speaker;

extract a plurality of speech frames containing voiced speech from the input audio; compute a plurality of features for each of the speech frames of the input audio;

compute a plurality of recognition scores for the plurality of features;

compute a speaker classification result in accordance with the recognition scores; and output the speaker classification result, wherein the memory further stores instructions that, when executed by the processor, cause the processor to receive an allegation that the speaker is a particular enrolled speaker of a plurality of enrolled speakers, wherein the speaker classification result is a speaker verification indicating whether the speaker of the speech of the input audio corresponds to the particular enrolled speaker of the plurality of enrolled speakers, wherein the memory further stores instructions that, when executed by the processor, cause the processor to compute the speaker verification by:

comparing the recognition score corresponding to the particular speaker to a threshold value; and outputting a speaker verification indicating that the speaker of the speech of the input audio corresponds to the particular enrolled speaker of the plurality of enrolled speakers in response to determining that the recognition score exceeds the threshold value and determining that the recognition score is higher than all other enrolled speakers, and wherein the threshold comprises a speaker-specific threshold, and wherein the speaker-specific threshold is computed by solving for an intersection between a first Gaussian distribution representing the probability that the speaker of the input audio is one of the enrolled speakers and a second Gaussian distribution representing the probability that the speaker of the input audio is not one of the enrolled speakers.

* * * * *